United States Patent
Gupta et al.

(10) Patent No.: US 10,776,547 B1
(45) Date of Patent: Sep. 15, 2020

(54) INFINITE-DEPTH PATH-BASED ANALYSIS OF OPERATIONAL TIMING FOR CIRCUIT DESIGN

(71) Applicant: Cadence Design Systems, Inc., San Jose, CA (US)

(72) Inventors: Umesh Gupta, Noida (IN); Naresh Kumar, Noida (IN); Prashant Sethia, Noida (IN); Ritika Govila, Gurgaon (IN); Jayant Sharma, New Delhi (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/600,927

(22) Filed: Oct. 14, 2019

(51) Int. Cl.
   *G06F 30/3312* (2020.01)
   *G06F 16/901* (2019.01)
   *G06F 119/12* (2020.01)

(52) U.S. Cl.
   CPC ...... *G06F 30/3312* (2020.01); *G06F 16/9024* (2019.01); *G06F 2119/12* (2020.01)

(58) Field of Classification Search
   CPC ............ G06F 30/3312; G06F 16/9024; G06F 2119/12
   USPC ........................................................ 716/108
   See application file for complete search history.

(56) References Cited

U.S. PATENT DOCUMENTS

| | | | |
|---|---|---|---|
| 8,788,995 B1* | 7/2014 | Kumar | G06F 30/00 716/113 |
| 8,863,052 B1* | 10/2014 | Dhuria | G06F 30/367 716/108 |
| 9,875,333 B1* | 1/2018 | Verma | G06F 30/3312 |
| 2010/0281445 A1* | 11/2010 | Soviani | G06F 30/30 716/113 |
| 2016/0070844 A1* | 3/2016 | Shyamsukha | G06F 30/398 716/113 |
| 2020/0026812 A1* | 1/2020 | Feng | G06F 30/3312 |

* cited by examiner

*Primary Examiner* — Suresh Memula
(74) *Attorney, Agent, or Firm* — Tarolli, Sundheim, Covell & Tummino LLP

(57) ABSTRACT

A static timing analysis system for finding timing violations in a digital circuit design prior to circuit fabrication, and associated methods, use infinite-depth path-based analysis (IPBA) to achieve reduced pessimism as opposed to systems or methods employing only graph-based analysis (GBA), but with greatly reduced compute time requirements, or greater logic path coverage, versus systems or methods employing conventional or exhaustive path-based analysis. IPBA achieves the improved coverage or compute time results by slotting nodes of a circuit design graph into stages, propagating phases stage-by-stage for all paths in parallel, and merging phases wherever possible during the analysis.

20 Claims, 12 Drawing Sheets

INFINITE-DEPTH PATH-BASED ANALYSIS OF OPERATIONAL TIMING FOR CIRCUIT DESIGN

TECHNICAL FIELD

The present invention relates generally to electronic design automation (EDA) tools and techniques, and specifically to infinite-depth path-based analysis of operational timing for circuit design.

BACKGROUND

Electronic design automation (EDA) uses software tools for design and analysis of complex digital electronic systems such as printed circuit boards (PCBs) and integrated circuits (ICs). So as to ensure correct operability of a complicated digital electronic circuit design before significant investment is committed in the physical fabrication of chips or boards that use the design, and thus to avoid substantial waste and retooling, prior to fabrication of the design, a design can be required to pass a series of verification tests collectively referred to as "signoff." Signoff is accomplished in part by the performance of static timing analyses (STA), used in EDA tools to assess the timing of a digital circuit design, generally using software techniques and models that yield operational timing characteristics of the digital circuit design to discover, and thereby to correct through design modification, timing violations in a circuit being analyzed. Because design optimization to fix detected violations following STA frequently results in creating more violations, signoff typically involves numerous repeated iterations of remedial transformations of the circuit design. The use of pessimistic timing characteristics in STA disadvantageously results in false-positive violations, requiring costly over-fixing and wastefully increasing turnaround time, which in turn fails to minimize fabricated circuit product cost, time to market, power requirements, and substrate area, while maximizing circuit performance.

STA generally includes a plurality of different static timing analysis methodologies variously performing different algorithmic checks on the circuit design with attendant accuracy versus runtime tradeoffs for each. Examples of STA analyses include graph-based analysis (GBA), which performs timing analysis on a node-by-node level, traversing exhaustively throughout the circuit design, and path-based analysis (PBA), which performs algorithmic checks on the circuit design that are less pessimistic than with GBA in that they do not incorporate the same worst-case-scenario assumptions, and thereby do not result in generating the same false-positive violations. PBA requires greater runtime, memory footprint, storage footprint, and processing resources than GBA. Accordingly, GBA is generally used as a coarse filter to approve timing paths that clearly do not have timing violations, and PBA is subsequently used only on the unapproved timing paths, as a slower but finer filter to further winnow out timing paths incorrectly detected by GBA as containing violations.

GBA generates a timing graph for a given netlist and then computes the worst arrival and required times on the nodes of the graph. For nodes that are sinks of a timing path, it also computes the worst slack, slack being the difference between a desired arrival time (as defined by the constraints; usually, synchronized with the arrival time of a second signal) and the actual arrival time of a signal propagated through a given path of the circuit design as defined by the netlist and other parameters. In doing so, worst-case timing paths in the circuit design are determined. GBA identifies timing paths with apparent timing violations, where the computed timing is not within the margins allowed by the constraints. GBA makes certain pessimistic assumptions about the behavior of each stage. For example, it may assume the input slew, i.e., the time it takes a signal to "ramp up" from "off" to "on," or "ramp down" from "on" to "off," to be at its worst for each gate within a timing path. Such pessimistic assumptions allow GBA computations to operate comparatively quickly, but at the cost of sometimes reporting a "false" timing violation where a more exact analysis would have shown that the timing path meets the constraints.

PBA peels a set of paths in non-increasing order of criticality and applies path-specific timing update to each of these paths. Path peeling, i.e., the process of determining paths between start points and endpoints in a network graph of a digital design (see FIG. 4 for a simplified example), is a computationally expensive process. By analyzing the path with reduced pessimism, many timing violations can be waived which in turn tells better timing signoff. Aside from this peeling, PBA otherwise performs similar computations to GBA, but takes into account the input slew and other variables that would actually be encountered in a timing path, rather than simply assuming the worst case slew of all inputs, as GBA pessimistically would. These more complex computations take considerably longer than those of GBA, and if applied to all paths in the circuit can require an unfeasible amount of runtime and processing power to approach completion. Combining GBA and PBA by performing them successively can return first a coarse timing report indicative of a GBA-violating zone, whereafter only timing paths with apparent timing violations according to GBA are re-analyzed under PBA, without the pessimism of GBA, to potentially determine that timing paths with apparent timing violations (as determined by GBA) do not, in fact, violate the provided constraints, and therefore do not require redesign, through what is known as an engineering change order (ECO).

SUMMARY

One example includes a method for detecting timing violations in a circuit design. An infinite-depth path-based static timing analysis (IPBA) is executed with at least one processor coupled to a memory storing physical implementation data for the circuit design having a plurality of timing paths, each path proceeding between a beginning point for the path and an endpoint for the path, and each path having at least one node thereon. The IPBA includes slotting nodes of a designated subset of the plurality of timing paths into stages. The IPBA further includes propagating a plurality of signals through the nodes of the plurality of timing paths stage-by-stage, thereby treating the paths in the subset of the plurality of timing paths in parallel (as opposed to one path at a time). For at least a respective one of the stages, for each signal, of the plurality of signals, arriving at a respective node in the respective stage, path-based static timing analysis (PBA) timing characteristic values are computedFurther for the at least one respective stage so traversed, corresponding first and second timing characteristic values of the computed timing characteristic values are merged by propagating from the respective node, to a subsequent node in a same path shared by the respective node and the subsequent node, the first timing characteristic value and not the corresponding second timing characteristic value. This merging can be based, for example, on the respective node converging multiple paths of the subset of the plurality of timing paths, and can be further based on a determination that a first timing characteristic value propagated to the respective node from a first of the multiple paths dominates the corresponding second timing characteristic value propagated to the respective node from a second of the multiple paths.

Another example includes a system detecting timing violations in a circuit design. The system includes at least one processor coupled to a memory storing physical implementation data for the circuit design having a plurality of timing paths, each path proceeding between a beginning point for the path and an endpoint for the path, and each path having at least one node thereon. The system further includes an infinite-depth path-based static timing analyzer configured to perform IPBA. The IPBA includes slotting nodes of a designated subset of the plurality of timing paths into stages. The IPB A further includes propagating a plurality of signals through the nodes of the plurality of timing paths stage-by-stage, thereby treating the paths in the subset of the plurality of timing paths in parallel (as opposed to one path at a time). For at least one of the stages, for each signal, of the plurality of signals, arriving at a respective node in the respective stage, the IPBA further includes computing PBA timing characteristic values. Also for the at least one respective stage so traversed, the IPBA further includes merging corresponding first and second timing characteristic values of the computed timing characteristic values by propagating from the respective node, to a subsequent node in a path shared by the respective node and the subsequent node, the first timing characteristic value and not the corresponding second timing characteristic value. This merging can be based, for example, on the respective node converging multiple paths of the subset of the plurality of timing paths, and can be further based on a determination that a first timing characteristic value propagated to the respective node from a first of the multiple paths dominates the corresponding second timing characteristic value propagated to the respective node from a second of the multiple paths.

Yet other examples include one or more computer-readable media configured to provide a computer as the system set forth above, or to execute in conjunction with a computer the method set forth above. For example, a non-transitory computer-readable medium can store instructions that, when executed on a processor, perform IPBA to analyze physical implementation data for a circuit design having a plurality of timing paths, each path proceeding between a beginning point for the path and an endpoint for the path, and each path having at least one node thereon. The IPBA can include slotting nodes of a designated subset of the plurality of timing paths into stages. The IPBA can further include propagating a plurality of signals through the nodes of the plurality of timing paths stage-by-stage, in parallel. The IPBA can further include, for at least a respective one of the stages, computing PBA timing characteristic values for each signal, of the plurality of signals, arriving at each respective node in the respective stage. The IPBA can then further include merging corresponding first and second timing characteristic values of the computed timing characteristic values by propagating from the respective node, to a subsequent node in a path shared by the respective node and the subsequent node, the first timing characteristic value and not the corresponding second timing characteristic value. The merging can based, for example, on the respective node converging multiple paths of the subset of the plurality of timing paths, and can be further based on a determination that the first timing characteristic value propagated to the respective node from a first of the multiple paths dominates the corresponding second timing characteristic value propagated to the respective node from a second of the multiple paths.

DETAILED DESCRIPTION

Figure 1:
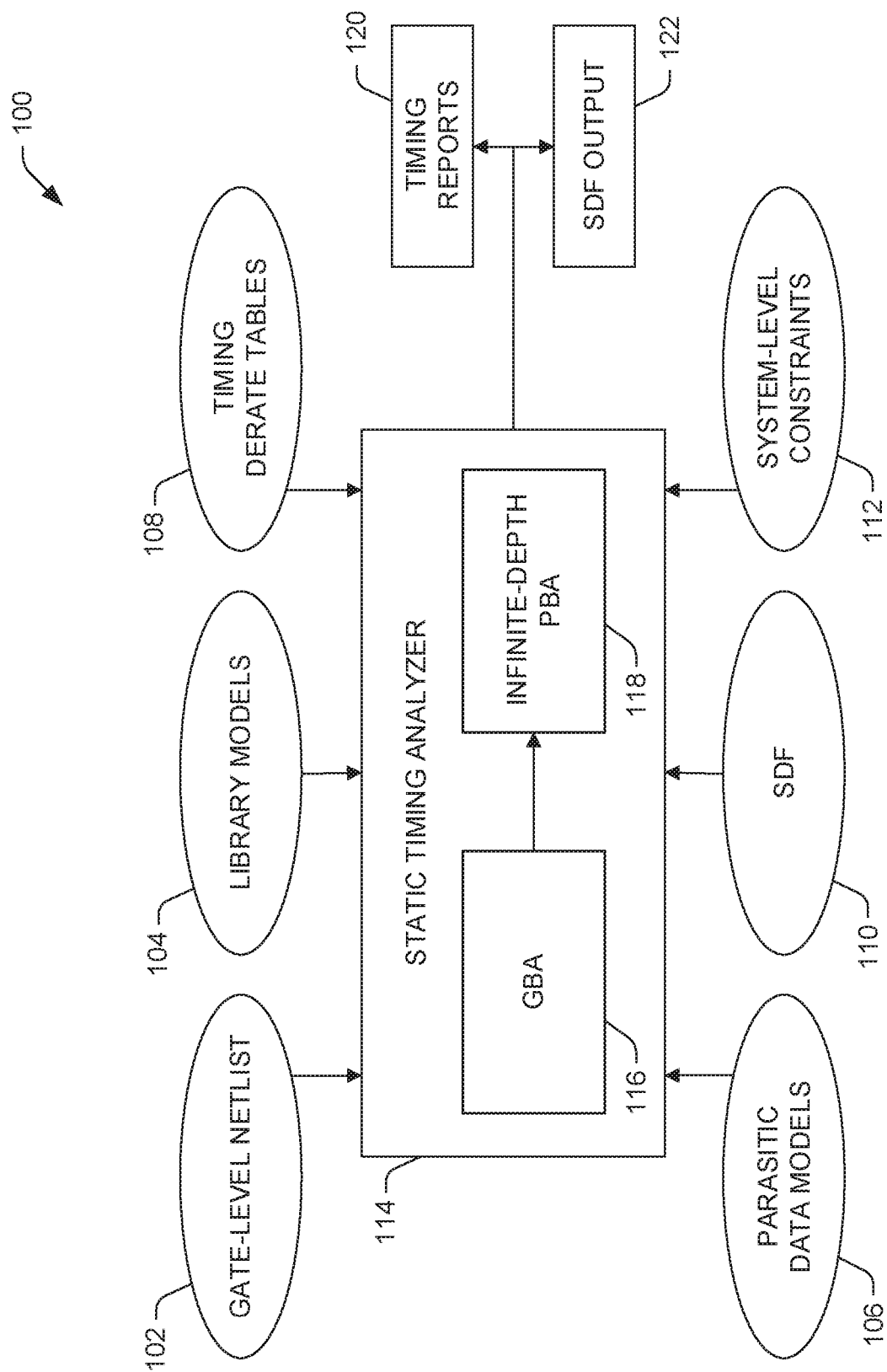
FIG. 1 is a block diagram of an example system for static timing analysis using infinite-depth path-based analysis.

FIG. 1 illustrates a system 100 for infinite-depth path-based analysis of operational timing for a digital circuit design undergoing signoff. The system 100 defines the design to be analyzed through a number of inputs 102-112 to a static timing analyzer 114. One or more of the inputs 102-112 together form a model of the analyzed circuit for analyzer 114 to test the timing on, thereby providing outputs 120, 122. Analyzer 114 can include any number of different components for providing the desired timing testing of the design, including but not limited to a graph-based analyzer 116 and an infinite-depth path-based analyzer 118, as described in greater detail below. Static timing analyzer 114 may be implemented as either software or as specialized computing hardware (e.g., as a custom IC or ASIC). For example, static timing analyzer 114 may be integrated into an electronic design automation (EDA) tool. Timing analysis may, for example, employ simulated propagation of a waveform through the digital circuit design on the basis of the various structural and functional definitions and constraints provided by inputs 102-112. A waveform is a time series of values representative of voltages as can be applied at various inputs of the digital circuit design and thereby propagated through the paths of the circuit.

A gate-level netlist 102 can be provided as a model input to define the topology and desired functionality of the circuit design. Various kinds of library models 104 may be required to perform static timing analysis. As examples, Liberty-format-specified .lib library models define delays of standard digital gates (AND, OR, NOT, flip-flop, latch, etc.) and macros; Advanced On-Chip Variation (AOCV) models can be used for performing advanced static timing analysis; and a Cadence Data Base (CDB) models can be used for performing signal integrity (SI) analysis. Parasitic data models 106, for example, those specified in the Standard Parasitic Exchange Format (SPEF), represent parasitics (e.g., parasitic capacitances and parasitic resistances) of interconnects (i.e., wires) in a chip. Timing derate tables 108, providing values referred to as "timing derates," characterize variation in signal propagation delay through a logic cell as a function of one or more contributors to propagation delay variability between different chips, between different areas on a chip, or between chips of the same design that are produced or operated at different times or under different conditions. Timing derates can be applied as multipliers to calculated propagation delay values, which can be added to input arrivals to get new arrival times. Thus, for example, a calculated delay of 100 time units might be multiplied by a timing derate of 1.2 to produce a derated delay of 120 time units. Timing derates can be based on, or modified by, factors such as spatial information, for example, the chip area consumed by simulated portions of a digital design. Input from a Standard Delay Format (SDF) file 110 SDF can provide cell delays and estimated interconnect delays used for static timing analysis. A set of system-level constraints 112 define the desired timing that is envisioned from the digital circuit under consideration.

The results produced by the static timing analyzer 114 can include timing reports 120, which can point out the locations of violations in paths, and an SDF file 122, as a tool-independent way of storing the generating timing data, which can include one or more of module path, device, interconnect, and port delays; setup, hold, recovery, removal, skew, width, period, and nochange timing checks; path, skew, period, sum, and diff timing constraints; the information related to the intended operating timing environment; incremental and absolute delays; conditional and unconditional module path delays and timing checks; design/instance-specific or type/library-specific data; and scaling, environmental, and technology parameters. Timing reports 120 can separate the analyzed circuit design into a number of signal flow paths, which are subsections of digital circuits in the design, and then state whether each path is meeting the set constraints 112.

Static timing analyzer 114 can read-in the various inputs 102-112 defining the circuit design testing model and then can build a persistent model of static timing analysis by creating a timing graph for the given netlist 102 and then, using, e.g., graph-based analyzer 116, computing the worst arrival and required times on the nodes of the graph. For certain nodes characterized as endpoints, it can also compute the worst slack.

Infinite-depth path-based analyzer 118 can serve as an extension to graph-based analyzer 116 and can be used to target pessimism reduction (and also optimism, in certain cases where GBA cannot cater to the requirements like waveform propagation due to compute and resource-intensive tasks) that has been introduced at various stages of the graph-based analysis performed by graph-based analyzer 116. Various types of pessimism introduced during GBA include slew merging pessimism impacting delay computation on the timing network; graph-based derating factors (advanced on-chip-variation factors); and signal integrity (SI) effects.

Figure 2:
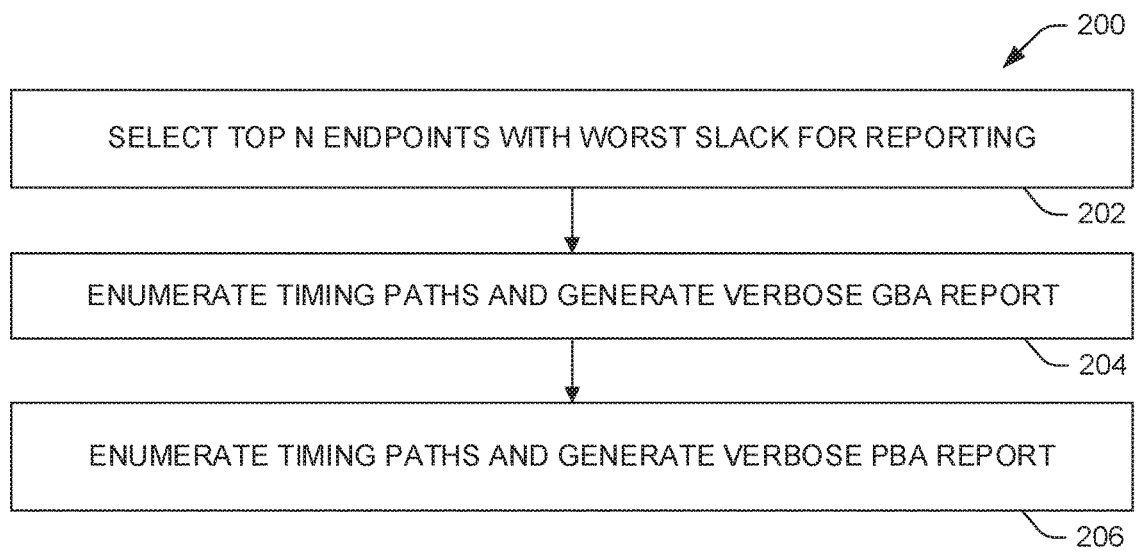
FIG. 2 is a flowchart illustrating a method of timing analysis.

The generation of timing reports by static timing analyzer 114 in PBA is described at a high level by flow diagram 200 of FIG. 2. The analyzer selects 202 the top N endpoints with the worst slack (N being an integer) for reporting. Then, the analyzer enumerates 204 timing paths and generates a verbose GBA report, e.g., using graph-based analyzer 116. Then, the analyzer enumerates 206 the timing paths and generates a verbose PBA report, e.g., using infinite-depth path-based analyzer 118.

Infinite-depth path-based analyzer 118 can perform infinite-depth path-based analysis (IPBA), which can differ from exhaustive path-based analysis (EPBA) in a number of respects. EPBA aims at exhaustively covering all timing paths in the design during PBA. In either case the goal is to discover violations so that they can be corrected with redesign of the digital circuit prior to fabrication, but to avoid "overfixing" by not redesigning to correct false-positive violations as may have been detected by GBA. Definition of a variety of terms can assist in aiding discussion of the differences between EPBA and IPBA.

A failing endpoint, also referred to as a violating endpoint, is an endpoint to at least one path indicated by GBA or PBA as having a failing slack based on the defined violating boundary value. The worst GBA timing slack on an endpoint is referred to as the GBA endpoint slack for that endpoint, implying that there exists at least one GBA path ending at that endpoint having a GBA slack equal to the GBA endpoint slack for that endpoint, and all other paths ending at that endpoint will have a GBA path slack that is either equal to or better than the available GBA endpoint slack, but not worse than that of the GBA endpoint slack for that endpoint.

The PBA timing slack of an endpoint is referred to as the retimed endpoint slack or the PBA endpoint slack. PBA endpoint slack implies that there exists at least one PBA path ending at that endpoint having a PBA slack equal to the PBA endpoint slack of the endpoint. The PBA endpoint slack may not be the worst PBA slack available on that endpoint, if all the paths ending at that endpoint have not been exhausted in the path-based analysis, and there remain more paths, which may have a worse slack beneath the given path ending at that endpoint. However, if all paths ending at the given endpoint have been analyzed using PBA such that there remain no other paths ending at that endpoint, the true worst PBA endpoint slack can be expected to be have been achieved, which is to say that the all paths ending at that endpoint will have a PBA path slack that is either equal to or better than the PBA endpoint slack for that endpoint.

"Exhaustive" PBA may not be truly exhaustive in that it may not analyze every path in a design. For example, EPBA may be configured such that it looks at each violating endpoint and analyzes only a certain number N of the worst GBA paths ending at a given endpoint among the violating endpoints. The integer value N is called the "Nworst depth search limit," which defines the maximum depth of paths per endpoint picked for PBA analysis. Moreover, EPBA may be configured such that it performs PBA evaluation only on a certain number of M of the worst GBA paths in the entire design. The integer value M is called the "max paths search limit," which defines the maximum search radius in terms of the maximum total number of paths picked for PBA analysis.

Clock signals and the data signals corresponding to every clock that can be stored and propagated by the static timing analyzer 114 may be termed as phases. These phases may include clock phases and data phases (corresponding to every clock). A "phase" can be thought of as a container for waveforms, slew values ("slews"), arrival times ("arrivals"), and delay times ("delays") for a particular signal. When, in the timing analysis, multiple signals are propagated through multiple paths, these values for any particular signal can be collectively referred to as the "phase" of that signal. Thus, for example, if a first signal is propagated from a node "A," at the node "A" the signal will have some waveform, it will have some arrival time, it will have some slew, and it will have some delay. All of these values for a signal at a particular node can be stored and propagated inside a phase container. If the first signal is propagated to a next node, node "C," the same phase container will have different waveform, slew, arrival time, and delay values at node "C" for the propagated first signal. However, if, at node "C," a second signal comes in to node "C" from node "B" (i.e., in addition to the first signal from node "A"), then at node "C" two signals will be present: the first propagated signal from node "A" as well as the second propagated signal from node "B." The two signals are then represented by two phases at node "C": the first phase at node "C" will carry the data for the first propagated signal and the second phase at node "C" will carry the data for the second propagated signal.

"Phase," as used herein, is thus a term used to refer to a group of propagated data values at any particular node in a digital design graph. There may, for example, be five data values within a phase. At each node, these data values are updated and, if possible, merged to create one or more phase containers that are propagated forward. In contrast to PBA, in which signals are analyzed by propagating them through paths one path at a time, in IPBA, signals are propagated through the paths in parallel using a breadth-first search (BFS) graph traversal technique, with all the beginning points being taken in one go. Signal propagation thus commences from all beginning points substantially simultaneously (as opposed to one path being traversed in its entirety before proceeding to timing analysis of another path), with signal merging happening wherever possible during propagation. This signal merging means that if a first signal "dominates" a second signal, the second signal is not propagated to a subsequent node in the timing analysis. Only a dominating signal is propagated from that node onwards. To "merge phases" at a node thus means to create a new phase container that contains only the dominant values from the multiple phase containers being merged, and to propagate the merged phase rather than propagating each of the individual phases being merged.

"Dominance" of a value in this context means a worst value out of the values being compared. With respect to timing entities which are represented by numbers (e.g., arrival time), the worst value can be determined by directly comparing two values and finding which one is the worst. For late paths, greater arrival time will be the worst, and for early paths, a smaller arrival time will be the worst. With respect to waveforms, dominance is determined by looking at the shapes of two candidate waveforms. Dominance of one waveform over another means a larger value at all relevant times in the simulation when the two time series are compared on a time-instant-by-time-instant basis. Accordingly, two waveforms will not be merged, but instead will be propagated separately, if, for some time values, one of the two waveforms comprises voltage values greater than those of the other of the two waveforms but, for one or more other time values, comprises voltage values less than those of the other waveform. In other words, if, graphed together, the graph of one waveform crosses the graph of the other waveform, neither of the two is dominant. If none of these is dominant, these will not be merged and will be propagated separately. As waveforms propagate through multiple nodes in a path, it can be expected that the waveforms will get smoother, which in some cases can mean that two waveforms unable to be merged at one node may become mergeable at some later node in a path.Clock reconvergence pessimism (CRP) is a difference in delay between the common part of the launching and capturing clock paths, or in other words, maximum clock delay minus minimum clock delay. The most common causes of CRP are reconvergent paths in clock network, and different minimum and maximum delay of cells in the clock network. CRP is considered as a pessimism added to timing analysis in general. This pessimism occurs when the static timing analyzer 114 compares two different clock paths that partially share a common physical path segment, and it assumes the shared path segment has a minimum delay for one path and a maximum delay for the other path. Many circuit designers choose to remove this pessimism, and such pessimism removal is termed as "common point pessimism removal" (CPPR).

Figure 3:
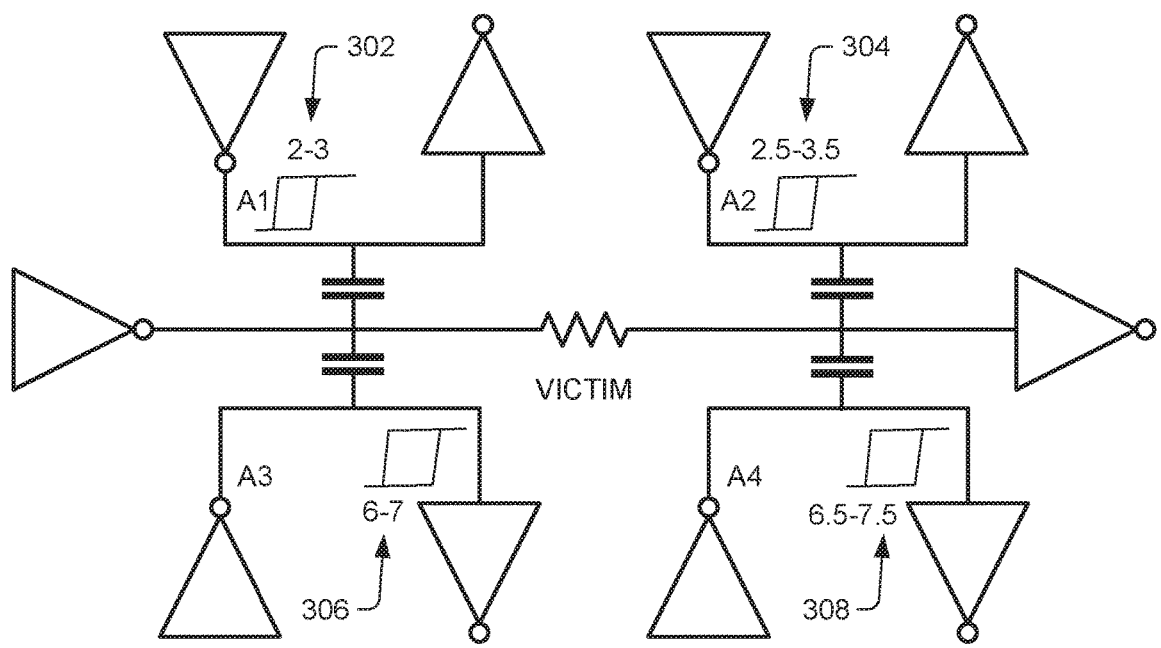
FIG. 3 is an example portion of a digital circuit in timing analysis.

The earliest and latest possible signal arrival times at a node are collectively termed as the "timing window" (TW). In synchronous logical circuit designs, these signal arrival times are with respect to clock phases. A signal that is triggered by a clock phase will have a minimum possible (earliest) arrival time and a maximum possible (latest) arrival time, when it can transition. Timing windows represent the range of time during which a signal can transition, represented as [minArrival-maxArrival]. The minimum or maximum time of this range is known as an "arrival edge." FIG. 3 illustrates a simple circuit with timing windows 302, 304, 306, 308 indicated at various nodes. The numerical ranges given in FIG. 3 represent the timing windows for respective stages of the illustrated circuit. For stage A1, the timing window range is 2-3, that is, the time interval in which net/signal A1 can switch.

Figure 4:
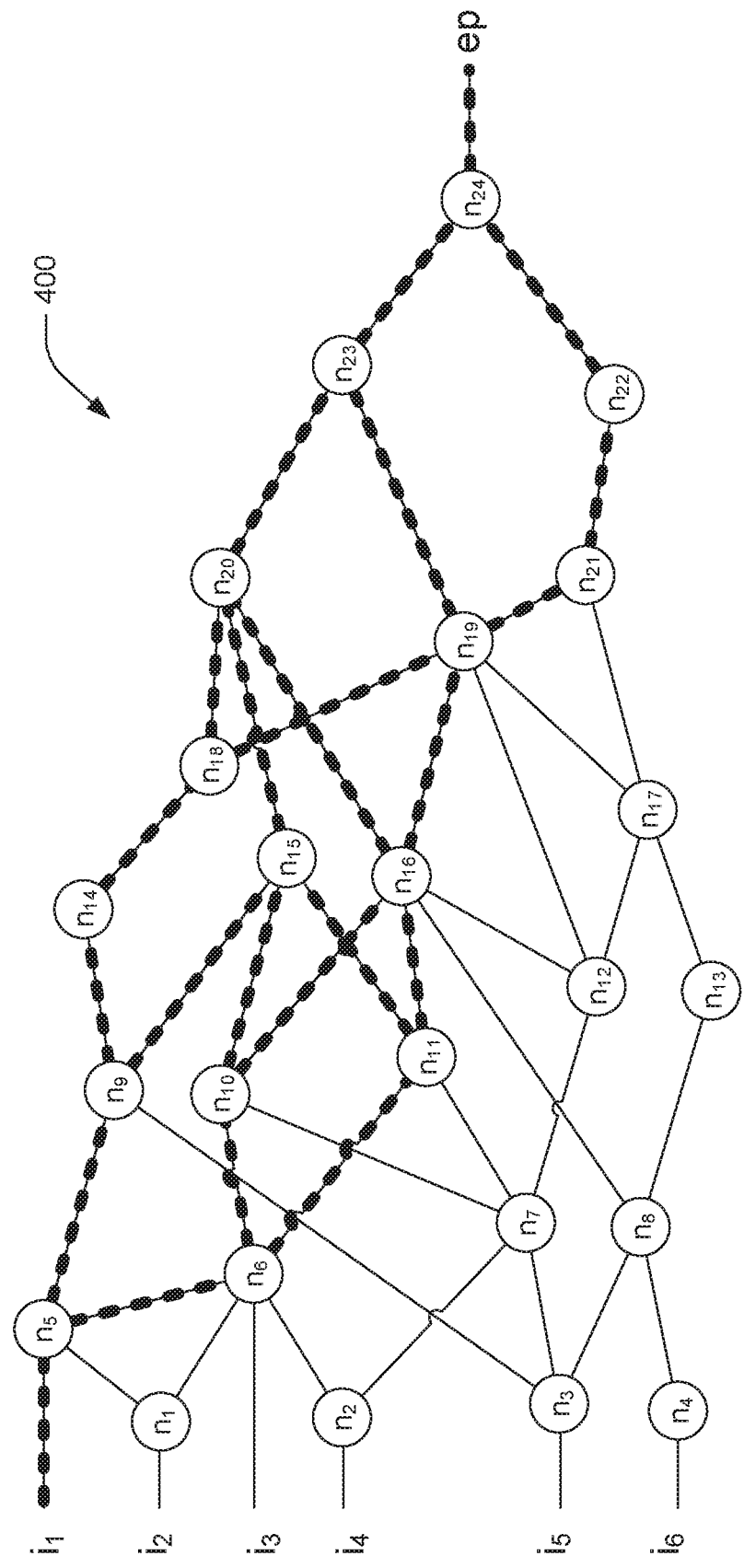
FIG. 4 is an example graph with paths peeled in exhaustive PBA between only a first beginning node and an endpoint node.

The example network diagram of FIG. 4 illustrates an example EPBA process for a network 400 of twenty-four nodes in a circuit design, the nodes numbered $n_1$ through $n_{24}$, the network 400 having six inputs numbered $i_1$ through $i_6$, and one endpoint labeled ep. The nodes are arranged such that signals propagate through the network only from left to right in the diagram as drawn. Provided enough time and computing resources, the goal of EPBA is to achieve full PBA coverage of all timing paths in the circuit design. As there can be multiple paths having the same endpoint, or even having the same start point/endpoint combination, EPBA is aimed at retiming all the timing paths at every violating endpoint in the design. All the GBA violating paths are enumerated for PBA analysis up to the defined Nworst depth or until all paths to a violating endpoint have been exhausted. As shown in FIG. 4, for a given endpoint ep, there can be multiple timing paths that need to be retimed, even corresponding to one start point ($i_1$). Accordingly, there could be a very large number of timing paths corresponding to every endpoint in a larger circuit design. Even for the relatively small graph of FIG. 4, there are numerous paths between start point $i_1$ and endpoint ep. The number of paths can be even greater than might be apparent by tracing paths from the diagram of FIG. 4, because even within a node there may be different paths, given that the transition of a signal (e.g., from "high" to "low", or "low" to "high") can be different, and "rise paths" are treated as separate paths than "fall paths" for the purposes of timing analysis.

Digital circuits having complex combinational logic, such as adder pipelines or series of XOR chain-based data path structures, have become common design features. However, having such complex structures in the design can lead to a combinational explosion of timing paths requiring analysis for remedial transformation, optimization, and signoff. The number of individual timing paths can be in the billions or more, and many examples can have millions of timing paths per endpoint in a design. PBA helps remove the timing pessimism introduced by GBA, which propagates worst-case timing across an analyzed design.

Conventionally, once GBA analysis is done, human users select timing violations flagged by GBA and analyze them with PBA analysis, path by path, to determine if these paths are still violating after PBA's amelioration of the pessimism added by GBA. With increasing design sizes and complexity, it can be time-inefficient and practically impossible to guarantee covering all possible failures with PBA, and any remedial transformation ("fixing") of the design to eliminate timing violations is only as reliable as computed PBA results.

Because any violating endpoint may have a number paths arriving at it, in order to declare a GBA-detected violating endpoint "clean" (i.e., free of timing violations), all paths to that endpoint have to be analyzed with PBA, and their PBA slacks evaluated. As the paths driving the given endpoint are ordered with respect to GBA slacks and not with respect to PBA slacks, it is possible that Nth path might pass with PBA but the (N+1)th path might still fail. To ensure that all paths leading to a given endpoint meet timing requirements, it does not suffice to evaluate the first N GBA violating paths using PBA and to declare the rest as clean merely because the first N GBA violating paths turn out to be clean after PBA analysis. Even if the first N GBA violating paths are clean, a subsequent GBA violating path might still violate for PBA slack.

Exhaustive PBA (EPBA) addresses the above requirement to evaluate all paths leading to a given endpoint to make sure there that all timing violations are covered. Exhaustive PBA can be configured with high depth and software can evaluate the number of paths (equivalent to this depth) per endpoint to flag the worst PBA violation discovered out of this depth. Endpoint depths typically vary from 10K to several million. EPBA techniques are of limited use in large designs or in designs having re-convergent logic, because such designs exhibit a combinational explosion in the number of paths. A number of factors contribute to the inability of EPBA to timely cover all paths in a design, among them the following. First, an exhaustive search of all paths may time out, or a search performed to a specified path depth may max out, before all beginning points and endpoints are covered. Second, impractically long runtimes may be required to cover the endpoints/paths within the max paths and Nworst depth search limits, such that the intended path coverage may not be achieved within an acceptable runtime or there may be insufficient computing resources to do so. Third, no existing tools support incremental PBA analysis, i.e., analysis only on remaining paths, where EPBA is attempted multiple times consecutively. Each EPBA iteration starts a full PBA analysis of all timing paths all over again, and there is no mechanism to preserve the previous state of PBA iteration (if any), meaning that the timing paths already analyzed are reanalyzed in every PBA iteration. All the timing paths, within the max paths search limit and Nworst depth search limit, are retimed. However, if the max paths search limit or the Nworst depth search limit is hit with paths or endpoints remaining, no PBA analysis is done on those, and such paths cannot be retimed, as illustrated in the following example.

Figure 5:
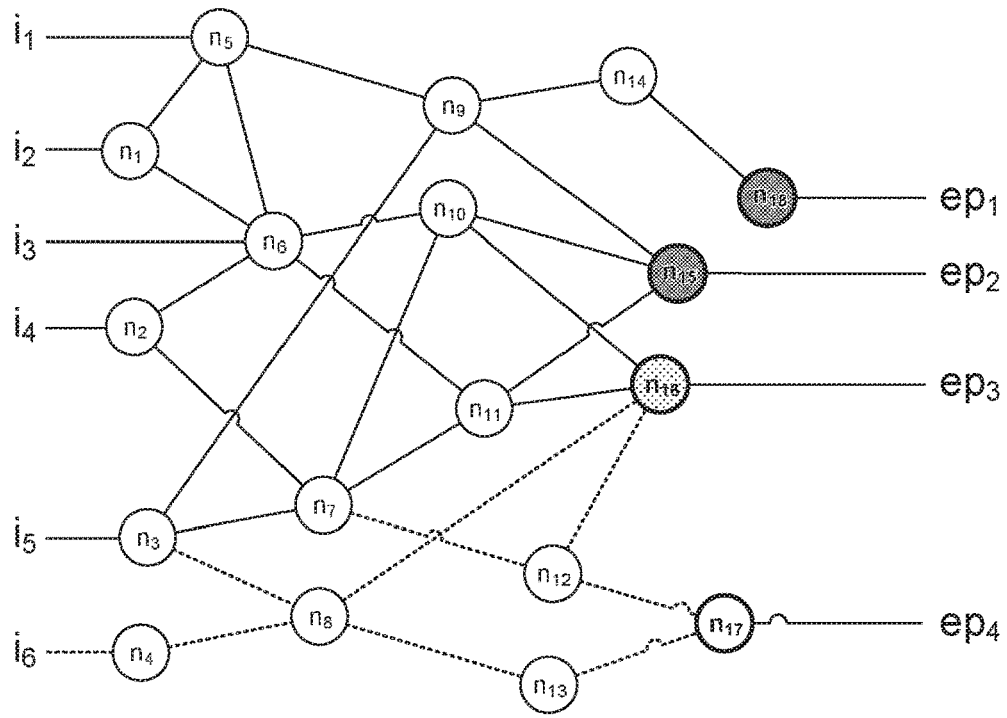
FIG. 5 is an example graph illustrating the result of exhaustive PBA.

FIG. 5 illustrates an example signal flow network graph, simplified for illustrative purposes, having four GBA violating endpoints $ep_1$, $ep_2$, $ep_3$, $ep_4$ having a number of beginning points (not shown) and numerous timing paths between them (illustrated as solid or broken lines). Paths are processed until defined Nworst depth & max path upper limits are hit, or available design depth is exhausted within the specified Nworst depth limit. The endpoint PBA coverage percentage is a function of the total number of timing paths in the design, the Nworst depth search limit, and the max paths search limit. In the diagram, darker-shaded endpoints are those that have been fully retimed (at least to within the Nworst depth search limit) and thus have a guaranteed worst PBA slack. Lightly shaded endpoints are endpoints that have been partially retimed, but for which the worst PBA slack not guaranteed. Unshaded endpoints are those that have not been retimed by PBA analysis, meaning that they remain GBA bounded.

In the example of FIG. 5, when EPBA is attempted to retime all paths, the analysis can be depth-limited and/or runtime-limited. In the illustrated example, the search limits to have been exhausted such that only endpoints $ep_1$ and $ep_2$ are exhaustively PBA covered with true worst slack identified for the defined Nworst depth search limit. Endpoint $ep_3$ is only partially PBA covered, such that the slack reported on $ep_3$ in this case is the GBA slack of the (N+1)th path, as some paths to that endpoint remain beyond the specified Nworst depth limit. As indicated by the broken-line paths leading to endpoint $ep_4$, endpoint $ep_4$ is not covered at all, due to the max paths search limit being exhausted. Therefore, the true worst PBA slack in this example will be provided only for endpoints $ep_1$ and $ep_2$ and many endpoints/paths may not get completely analyzed or analyzed at all using PBA.

Although it is theoretically possible to use higher and higher depths to let the exhaustive PBA solve the problem of evaluating all paths leading to an endpoint and to learn if there is a real PBA violation leading to the analyzed endpoint, as a practical matter, with increased depth, the PBA runtime needed to evaluate more and more paths keeps increases to the point where it becomes unrealistic to evaluate all possible paths to violating endpoints. With EPBA, designers either evaluate up to depth N and fix the GBA timing of the (N+1)th path to avoid any PBA violation risks, or must take the calculated risk of waiving off the evaluation of paths beyond depth N.

Figure 6:
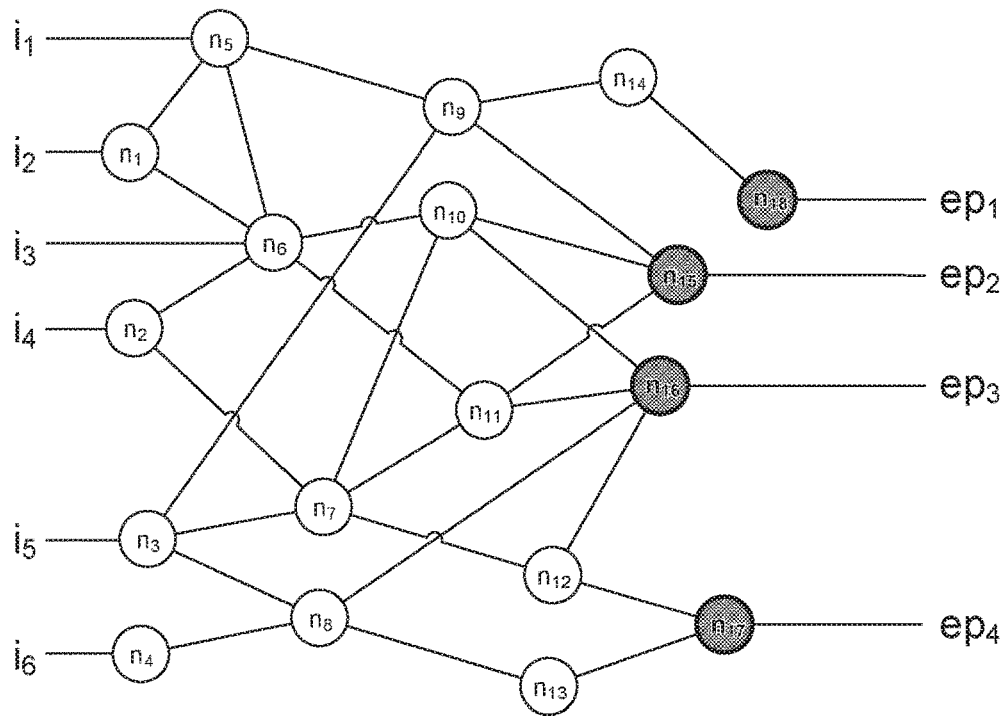
FIG. 6 is an example graph illustrating the result of infinite-depth PBA (IPBA).

FIG. 6 illustrates the example graph of FIG. 5 but as analyzed using IPBA. In IPBA, individual phases with PBA slews, arrivals, and/or waveforms are propagated across stages, ensuring that the PBA graph is created such that all paths may be retimed within practicable runtimes, and 100 percent PBA coverage of all violating paths is attained. As indicated by the darker shading of the endpoints in the example of FIG. 5, all four of the endpoints are retimed and have computed IPBA slack associated with them.

As used in the present application, "propagation" of a signal means computation of values describing the signal at a node in a path based on corresponding values at a preceding node and other information describing changes to the signal between the preceding node and the node. "Traversal" of a path or a graph of multiple paths, by contrast, refers to the order in which propagations are computed. The multiple paths of a circuit-design graph can be traversed serially (path-by-path), as in EPBA, or, as in IPBA, in parallel. Serial traversal of the paths would involve propagation of one or more signals between nodes of one path in the graph before propagating one or more signals between nodes of a different path in the graph. Thus, in the simple graph of FIG. 6, which includes the following N paths:

1. $i_1 \to n_5 \to n_9 \to n_{14} \to n_{18} \to ep_1$
2. $i_1 \to n_5 \to n_9 \to n_{15} \to ep_2$
3. $i_1 \to n_5 \to n_6 \to n_{10} \to n_{15} \to ep^2$
4. $i_1 \to n_5 \to n_6 \to n_{10} \to n_{16} \to ep_3$
5. $i_1 \to n_5 \to n_6 \to n_{11} \to n_{11} \to n_{15} \to ep_2$
6. $i_1 \to n_5 \to n_6 \to n_{11} \to n_{11} \to n_{16} \to ep_3$
7. $i_2 \to n_1 \to n_5 \to n_9 \to n_{14} \to n_{18} \to ep_1$
8. $i_2 \to n_1 \to n_5 \to n_9 \to n_{15} \to ep_2$
9. $i_2 \to n_1 \to n_5 \to n_6 \to n_{10} \to n_{15} \to ep_2$
10. $i_2 \to n_1 \to n_5 \to n_6 \to n_{10} \to n_{16} \to ep_3$
. . .

N. $i_6 \to n_4 \to n_8 \to n_{13} \to n_{17} \to ep_4$ a serial path-by-path traversal of the graph, as used in EPBA, might involve propagation of one or more signals provided to input $i_1$ through nodes $n_5$ to $n_9$ to $n_{14}$ to $n_{18}$ and on to endpoint $ep_1$, before moving on to propagate signals from nodes $n_5$ to $n_6$ to $n_{10}$ to $n_{15}$ to endpoint $ep_2$, for example. In other words, each path is considered one at a time in such serial analysis. By contrast, a parallel stage-by-stage traversal of the graph, as used in IPBA, considers nodes of multiple paths before completing analysis of any one path. As an example, such a parallel stage-by-stage traversal might slot nodes $n_1$, $n_2$, $n_3$, and $n_4$ into a first stage, nodes $n_5$ and $n_6$ into a second stage, nodes $n_7$ and $n_8$ into a third stage, nodes $n_9$, $n_{10}$, and $n_{11}$ into a fourth stage, nodes $n_{12}$, $n_{13}$, and $n_{14}$ into a fifth stage, and nodes $n_{15}$, $n_{16}$, $n_{17}$, and $n_{18}$ into a sixth stage, and might then proceed to propagate signals through these nodes largely in the order in which they have been numbered in the drawing, e.g., $i_2$ to $n_1$, $i_4$ to $n_2$, is to $n_3$, $i_6$ to $n_4$, $i_1$ and $n_1$ to $n_5$, $i_3$, $n_1$, and $n_2$ to $n_6$, $n_2$ and $n_3$ to $n_7$, $n_3$ and $n_4$ to $n_8$, and so forth.

The parallel stage-by-stage analysis of the graph yields several advantages. One advantage is that multiple nodes in a stage can be analyzed substantially contemporaneously using parallel processing, e.g., with plural computer processors or processing cores. Another advantage is that propagated phases, containing the information representative of the propagated signals, can be merged at convergent nodes based on the criteria described above. In the example graph of FIG. 6, node nib converges paths from nodes $n_6$ and $n_7$, which both receive signal(s) from node $n_2$ and ultimately from $i_4$. This merging results in a reduction of information that needs to be propagated and processed further in the analysis, e.g., in the present example, at node $n_{16}$, which receives the signal(s) from node $n_{11}$.

In static timing analysis, simulated signals propagated through a circuit design are represented by timing characteristic values including such values as waveform, slew, and arrival edge. Accordingly, these timing characteristic values are propagated, updated, and, where possible, merged in IPBA. Such timing characteristic values from one phase can respectively correspond to timing characteristic values from another phase. For example, a waveform of one phase at a node can have a corresponding waveform of another phase at the node; a slew of the one phase can have a corresponding slew of the other phase; and an arrival of the one phase can have a corresponding arrival of the other phase.

Figure 7:
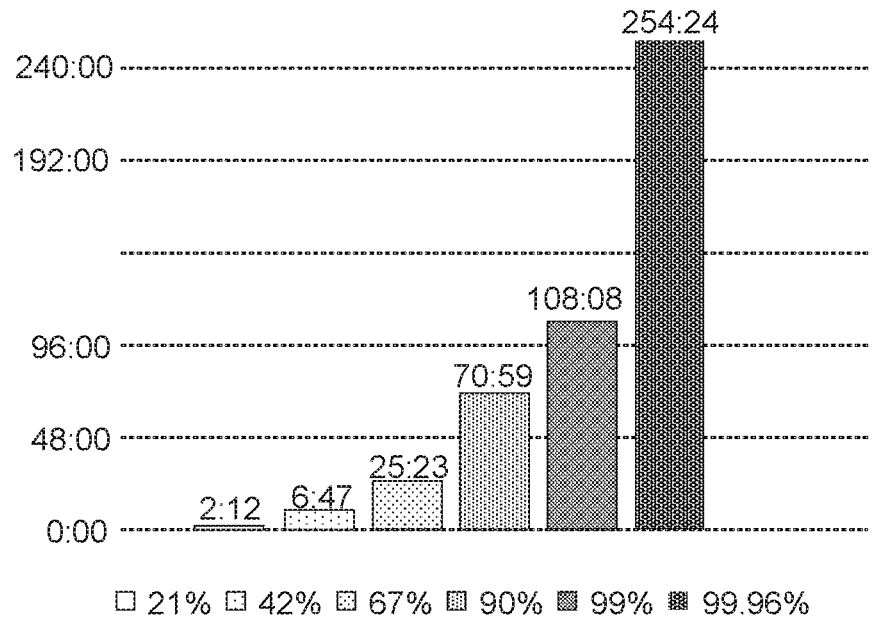
FIGS. 7 and 8 are bar charts showing runtime versus coverage for two different example digital circuit designs using IPBA.
Figure 8:
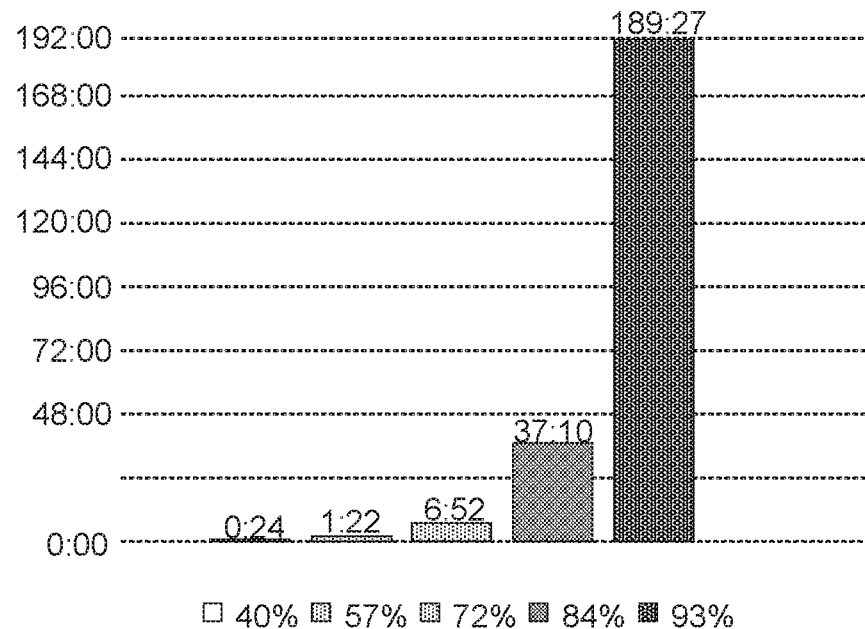

The problem of PBA analysis and limited coverage versus runtime metric is illustrated in the bar graphs of FIGS. 7 and 8. FIG. 7 shows, for each of six coverage percentages, the cumulative regular PBA runtime for a first digital circuit design, Design A, having 5 million instances and 2.4 million violating nodes. FIG. 8 shows, for each of five coverage percentages, the cumulative runtime for a second digital circuit design, Design B, having 9.6 million instances and 0.5 million violating nodes. Each design has complex combinational structures, as discussed above. FIG. 7 shows that 99 percent coverage of Design A is attained with a runtime of 108 hours and 8 minutes, and 99.96 percent coverage of Design A is attained with a runtime of 254 hours and 24 minutes. FIG. 8 shows that 84 percent coverage of Design B is attained with a runtime of 37 hours and 10 minutes, and 93 percent coverage of Design B is attained with a runtime of 189 hours and 27 minutes. None of the runs converge or attain 100% coverage, even after runtime of more than a hundred hours. Thus, the EPBA technique may not be able to evaluate all violating paths to a given endpoint, demonstrating the need to generate signoff quality EPBA results without the need for peeling and analyzing an impracticably high number of PBA depths.

The underlying cause of high analysis times using EPBA with higher depth is the practically infinite number of paths possible for a given endpoint because of highly re-convergent logic driving these endpoints. EBPA systems and methods repeatedly peel the Nworst paths for these endpoints and evaluate the PBA timing for them, but this path peeling never ends because of the re-convergent logic, leading to intractable runtimes and restricted design coverage. The presently described systems and methods, referred to as infinite-depth path-based analysis (IPBA), propagate PBA timings throughout the network graph in a similar manner as in GBA, doing away with the need for peeling individual paths for retiming. Specifically, IPBA propagates PBA results on top of PBA phases rather than on individual paths. The propagated phases are merged wherever possible so as to propagate the phases coming from multiple branches together. IPBA thus provides the ability to process PBA for unlimited/infinite depths. The described technique cuts down the PBA processing runtime significantly while also helping to attain more complete PBA design coverage. The reduced runtime can be leveraged to enhance PBA coverage.

In IPBA, propagated PBA phases are selectively merged, or otherwise, multiple phases are propagated together. For a given multi-input stage, based on different inputs corresponding to respective phases, the PBA delays of the stage are different for the different phases. This is unlike GBA analysis, wherein every stage has the same delay irrespective of individual phase arrival or corresponding inputs, like waveform.

To create a complete PBA graph using IPBA, first, all violating nodes of a GBA graph are slotted into stages per their respective arrivals. Once slotting is done, the PBA timing phases are propagated stage by stage starting from beginning points. At every stage, respective phases are propagated to next stage with PBA delays. Delay for every stage is calculated separately for each phase because the stage delay calculation uses the retimed SI victim edge (rather than the timing window, which is used by GBA) and the waveform corresponding to that specific phase. Using this delay calculation, detailed, accurate waveforms are propagated, such that IPBA provides results that are similar to those obtained by conventional PBA.

The individual phase-specific retimed delays, waveforms, and/or slews are propagated across stages. At converging points in the path where multiple delays or waveforms of the same phase cannot be propagated forward (such as at the output of multi-input gates), the retimed delays of similar phases are merged based on a pre-defined criterion (discussed below with regard to FIG. 10). However even at this point, to reduce pessimism, IPBA methods and systems can defer the merging for several additional stages (to achieve accuracy closer to EPBA) until they are truly merged, as discussed in greater detail below.

IPBA systems and methods accordingly provide a PBA solution that is faster than EPBA and more accurate than GBA for signoff, thereby obviating the need for conventional PBA analysis for all the timing paths in a digital circuit design. IPBA systems and methods can achieve full PBA coverage across all violating timing paths in the design, and can achieve PBA processing that is not depth-limited. IPBA systems and methods offer much faster analysis convergence of the design as compared to systems and methods employing conventional PBA. The following description describes how retimed phases are calculated, propagated and merged in IPBA systems and methods.

The following describes delay calculation during IPBA. In general, the arrival time of a signal at a current node can be calculated based at least on summing the signal's arrival time at a source node and the propagation delay from the source node to the current node. A delay calculator can calculate the propagation delay from a source node to a current node based on two values: slew at the source node and the "load" (i.e., the capacitance) at the current node. Slew values can either be passed to the delay calculator or can be derived by the delay calculator from waveforms passed to the delay calculator. When the phases are propagated to create a PBA graph in an IPBA system or method, different delays are calculated separately for each stage based upon respective inputs, such as waveforms, slews, arrival edges, common point pessimism removal (CPPR), next-stage arc, timing window common point pessimism removal (TW-CPPR), and spatial information. With respect to waveforms, every phase carries its own waveform. The delay corresponding to a phase is calculated based upon its input waveform. Waveforms are detailed and accurate as propagated by PBA, unlike in GBA, which uses compressed waveforms on data logic during a GBA calculation.

In waveform propagation mode, i.e., when waveforms are propagated in the phase containers, slew values can be irrelevant in IPBA because they are ignored by the delay calculation. But, as is done in PBA, phase-specific slews are propagated and passed on to a delay calculator during stage delay calculation. This is unlike GBA, which calculates the delays based upon worst slew per pin rather than per phase. As for arrival edges, individual stage delays are each calculated based upon a worst arrival edge carried by a corresponding phase. Because IPBA propagates worst case timing, it suffices to use worst arrival edge for the delay (SI) calculation for the worst case delay calculation. This is ensured by the following inequality, wherein Delay$_{(B)}$ and Delay$_{(Si)}$ respectively denote base delay and SI delay for a stage, and A$_{min}$ and A$_{max}$ denote two possible arrival edges at the input of a stage, where A$_{min}$<A$_{max}$. The stage SI delay DelayA$_{min(Si)}$ calculated with A$_{min}$ may be a longer delay than the stage SI delay DelayA$_{max(Si)}$ calculated with A$_{max}$. However, it is guaranteed that the total arrival at the stage output calculated with A$_{max}$ will be a longer delay than the total arrival calculated with A$_{min}$ i.e., $$A_{min}+\text{Delay}A_{min(B)}+\text{Delay}A_{min(Si)}<A_{max}+\text{Delay}A_{max(B)}+\text{Delay}A_{max(Si)}$$

Accordingly, the full arrival window [Min-Max] for stage delay calculation need not be considered in IPBA, which is concerned with worst case timing and can calculate phase-specific delays separately. This is again unlike GBA, which is required to consider the full arrival window for delay calculation because the same delay is used for every phase, and GBA must cater to non-worst case timing.

With respect to CPPR, PBA uses the exact-path CPPR for stage-delay calculation, because it calculates the delay for a specific path. Because IPBA calculates delays on a phase basis and a single phase can be used to trace down multiple paths, path-specific CPPR while propagating the PBA timing cannot be determined. Worst-case CPPR can be used for all paths possible through a given stage, just as in GBA, but this can be overly pessimistic. Because IPBA can be targeted on only a select set of paths between beginning points and endpoints, i.e., those paths having GBA-violating endpoints, and which can be many fewer than the total number of paths in a design, the worst-case CPPR can be used for paths that can be traced only through the GBA-violating zone, i.e., the set of paths determined to by the pessimistic GBA analysis to have timing violations. This can be less pessimistic and therefore closer to regular PBA. Accordingly, in IPBA a timer can propagate the worst CPPR possible through a given node based on only violating logic and IPBA uses this worst CPPR in computing the delay calculation during phase-specific delay calculation. This is unlike GBA, which uses worst CPPR across the full design logic.

In a path consisting of, in series, a source node, a current node, and a next node, calculation of a delay between a source node and a current node, in order to compute the arrival at the current node, can require not only the slew at the source node and the load at the current node, but also the "arc" at the next node, also known as the "next stage arc." This arc is not a single value but can be thought of as a container of values containing a number of values describing the properties of the connection between the current node and the next node. Such properties can come from a variety of input sources, including, for example, the timing library (i.e., library models 104 in FIG. 1). The next stage arc can be propagated on-the-fly when calculating the delay of a node, and therefore need not be stored or propagated in a phase container. With respect to next stage arc, while calculating the stage delay at the current node, PBA also passes on the next stage arc to enable the delay calculator to accurately model the stage-capacitance/stage-load specific impacts. This next stage arc is not available during IPBA, because the timing being propagated is specific to phases, and a single phase can trace multiple next stage arcs. Unlike in GBA, IPBA will not pass on the next stage arc. However, in cases where there is only next stage arc possible in the violating zone, it will be passed on to the delay calculator. More specifically, if a given stage has multiple next stage arcs, it will not be possible to decide which one to pick up, and therefore, they will be ignored. If the given stage has only next stage arc, it can be used for analysis. In cases where a stage has multiple next stage arcs but only one of these next stage arcs is present in violating zone, this violating-zone next stage arc will be selected for analysis and will be passed on to the delay calculator. IPBA only evaluates the design logic that has been flagged as violating by GBA. If a stage has two next stage arcs and both are present in violating zone, it will not use either of them for analysis. But if one of these arcs is not present in the violating zone, IPBA can ignore this next stage arc and effectively use the remaining next stage arc for analysis.

With respect to TW-CPPR, because IPBA propagates timing/delays on a phase basis and TW-CPPR is also phase specific, TW-CPPR information can be passed on to the delay calculator, just as is done in regular PBA analysis.

Spatial information ("spatial") captures the timing variation that can result from depth and distance every node has with respect to other nodes when actually fabricated on a chip. With respect to spatial information, IPBA also propagates spatial information (e.g., worst distance of the violating paths through an arc) across stages. This is unlike GBA, which calculates bounding box distance using the full chip size.

Timing propagation in IPBA will now be described. IPBA need not create phases for timing propagation beyond those already generated in a preceding graph-based analysis. Instead, IPBA replicates the existing timer phases and propagates its timing on top of the same timer phases. This helps simplify multiple propagation aspects, because the timer understands these phases and some analysis and reporting aspects are automatically taken care of on top of these phases. This means that when these phases are propagated from one stage to another in IPBA, the timer can easily propagate these phases in the same manner as it would propagate them in GBA. For example, if a phase needs to be propagated from source to sink of a stage, and there is some constraint asserted at a sink pin, the timer will need to account for that constraint to decide the arrival time at the sink pin within that phase. Such accounting can be taken care automatically as the timer understands the phases and can identify such cases automatically.

Figure 9:
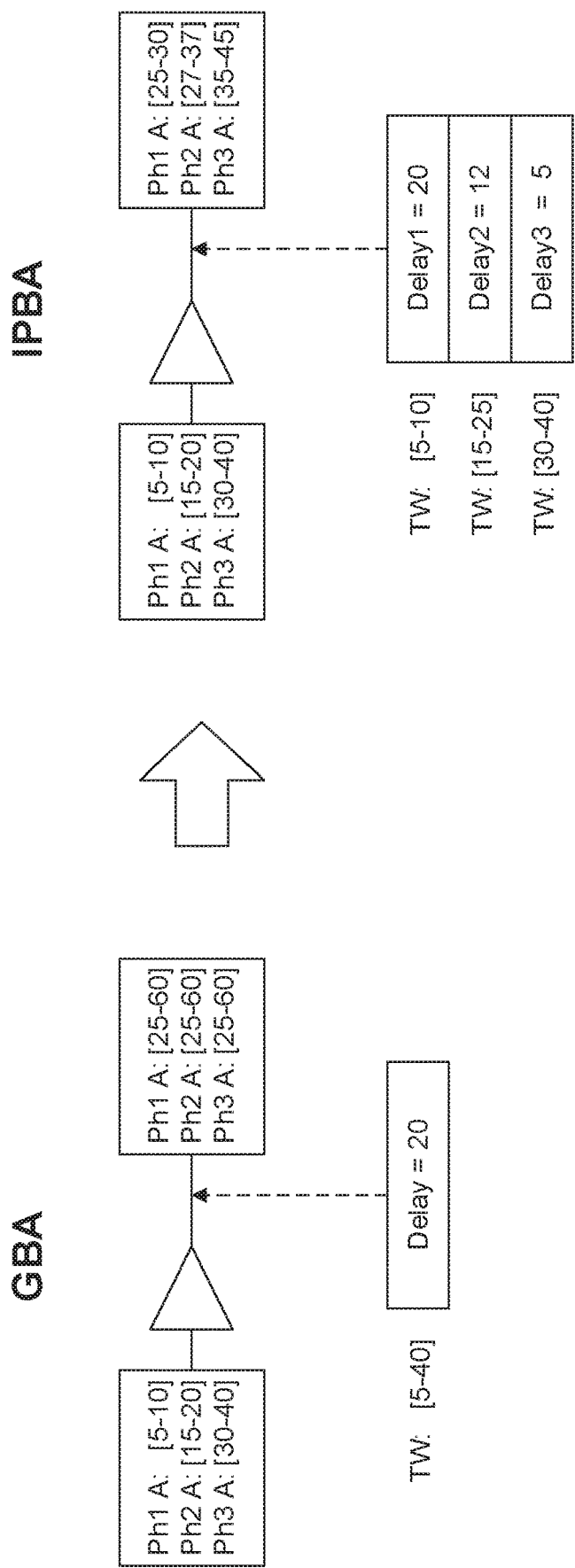
FIG. 9 illustrates an example of timing analysis using GBA followed by IPBA.

FIG. 9 illustrates phase-specific delay calculation in IPBA and demonstrates how IPBA leads to decreased pessimism compared to GBA. Timing windows (TW) are depicted as bracketed time ranges indicating early and late times according to time units not specified here. In the graph-based analysis of the timing of a digital circuit design shown on the left of FIG. 9, performed preliminarily to infinite-depth path-based analysis, only a single delay (20 in the illustrated example) is calculated based on a pessimistic arrival window [5-40], whereas the infinite-depth path-based analysis shown on the right of FIG. 9 calculates three separate delays for separate phases based upon respective arrival edges, and therefore final IPBA arrivals are less pessimistic as compared to the respective GBA arrivals.

IPBA can further employ phase merging to increase computational efficiency. Due to the increased computational cost of simulation associated with the proliferation of phases when phases are propagated throughout a digital circuit design graph, it can be practically impossible to branch out phases at every diverging point in the graph and propagate them separately, without merging them downstream. Accordingly, in IPBA, similar phases can be merged at converging nodes, and the merging can be deferred by a number of stages (e.g., two stages) to reduce the impact of merging pessimism. Even with phase merging, not all incoming phases to a node necessarily will be merged in IPBA. For example, if five source nodes are connected to a current node in a digital design graph, the analysis at the current node will receive as inputs five phases from each of the source nodes. In some instances, it may be the case that none of these five phases can be merged, whereupon all five of these phases will be propagated on from the current node in the analysis. In other instances, for example, two sets of two of these phases will be mergeable, in which case, three phases (two of them being merged phases) will be propagated on from the current node in the analysis. In still other instances, it may be the case that all five phases can be merged, in which case, only one phase will be propagated on from the current node in the analysis.

Figure 10:
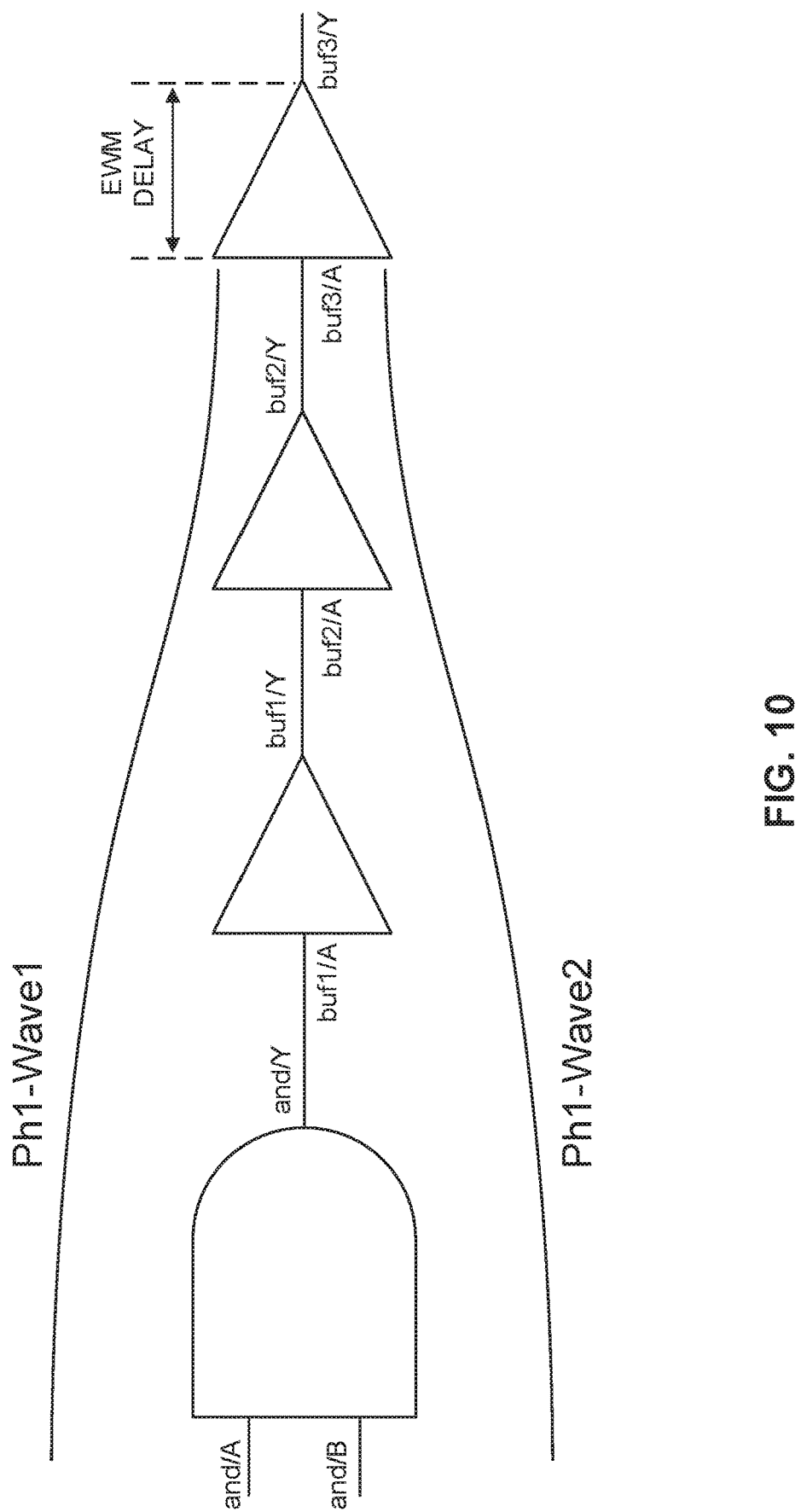
FIG. 10 illustrates an example of propagation of phases using IPBA through digital gates.

FIG. 10 provides a basic illustration of merging two similar phases in IPBA. In the example of FIG. 10, two similar phases Ph1 are propagated across different paths and/A, and/B and converge at the same point and/Y. Both these phases are similar in that they are modelling the same timer phase, although they may carry different arrival edges and different waveforms. In the illustrated example, these phases are not merged immediately at and/Y, as this might lead to significant pessimism. Merging for these two waveforms/arrivals in this case is deferred by two full stages and is done at buf3/A conditionally. In the illustrated example, this conditional merging for waveforms of similar phases at or after converging points can be performed according to the following criteria. Waveform Ph1-Wave1 can be propagated from buf3/A onwards based on waveform Ph1-Wave1 being dominant over waveform Ph1-Wave2 at buf3/A and the EWM delay of waveform Ph1-Wave1 between buf3/A and buf3/Y being longer than that of waveform Ph1-Wave2. Otherwise, waveforms Ph1-Wave1 and Ph1-Wave2 can both be propagated individually.

Dominance of arrival edges need not be checked during waveform merging. Arrivals of both waveforms can be merged using a max operation to make sure that the worst (i.e., the most pessimistic) results are propagated from the merging point onwards. The max operation can be applied for merging phase arrival edges beyond this point. The merged arrival edge can be calculated as the maximum of the arrivals of Wave1 and Wave2 of that phase, i.e., Merged Arrival Ph1=max(Arrival Ph1-Wave1,Arrival Ph1-Wave2)

In the example illustrated in FIG. 10, the two arrivals are merged at buf3/A, and the new phase carries the arrival based upon the max operation application on two individual arrivals at buf3/A. This is effectively a 3.5 stage (1+2+0.5) merging. This includes the stage of the AND gate (a stage that will always be delay evaluated for merging), the stages buf1 and buf2 (merging deferred by these two full stages), and buf3 is considered as a half-stage. Therefore, the illustrated example can also be interpreted as two-stage deferred merging. Experimental data shows that a one-stage deferred merging (1+1+0.5, i.e., AND+buf1+buf2) may also suffice, but the extra stage was included to address some optimism outliers observed. IPBA can limit this extended merging selectively based upon waveforms. For example, IPBA can include a mode in which in some cases a (1+2+0.5) merging is applied and in some cases a (1+1+0.5) merging is applied depending upon nature of waveforms.

IPBA systems and methods can further include "dirty mode" handling to provide improved performance in the initial design phases, when most of the design is violating and it might not make much sense to do worst-case PBA on the complete design logic. In these early stages, it may be acceptable to obtain worst-case PBA timing only on a part of a design. Such partial analysis can be invoked either by an explicit user setting in the analysis software tool, or can be invoked automatically, without any explicit user settings, based on the software tool's understanding of the current design iteration phase, as may be ascertained from testing logs or version numbers. To more efficiently deal with such violating design states in which there are significant number of GBA violating endpoints, the software tool can have a maximum endpoint limit defining the maximum number of endpoints that will be picked up by infinite-depth path-based analysis for IPBA timing propagation. In such cases, the analysis software tool can select a user-configurable top N GBA-violating endpoints (for example, as a default setting, N can be provided as 100K), mark the respective fan-in cones for these N endpoints, and propagate the IPBA timing across the marked fan-in logic only. In cases where a user desires to receive reporting for endpoints M>N, the software tool can then trace and report the excess M−N endpoints based upon GBA timing. As IPBA functions on the defined GBA-violating zone, this zone can be configured per design or per analysis requirement and IPBA can thus operate over the defined zone.

With respect to the quality of result (QoR) expectation for IPBA, in general, it can be expected that IPBA worst slack closely matches the worst possible PBA slacks across all paths for a given endpoint. As IPBA uses the max operator at merging points during propagation, said operator can add some pessimism to IPBA slacks with respect to the worst PBA slacks but such cases can be expected to be very limited as compared to the total number of endpoints evaluated in the design. Assuming no GBA path remains after depth exhaustion in EPBA reported paths, the following can be the expected accuracy trend across techniques:

GBA Slack≤IPBA Slack≤Worst EPBA Slack

No optimism can be expected to be seen for worst path between EPBA slack for any depth and IPBA slack. Worst EPBA slack is always expected to be bounded by IPBA slack. Pessimism in IPBA slack (versus EPBA slack) is not expected to be very high.

In some examples, an infinite-depth path-based analyzer can be implemented in a software timing tool capable of performing static timing analysis. The timing tool can be provided with a user-configurable setting to enable or disable IPBA flow. The tool can then perform GBA reporting, defining the GBA-violating zone. The timing tool can then trigger IPBA functionality to perform an efficient and accurate PBA analysis on the defined GBA-violating zone and report IPBA timing. The IPBA timing numbers reported can be expected to be sufficiently accurate for timing signoff. Alternatively or additionally, some or all IPBA violating timing paths can be passed off to an exhaustive path-based analyzer for timing analysis using EPBA. Even in such case, however, the number of paths analyzed using EPBA, and thus the computation power and time required to perform the EPBA, can be expected to be greatly reduced versus the number of paths, computation power, and time that would otherwise be implicated if EPBA were performed directly on the GBA-violating zone without intervening IPBA.

Figure 11:
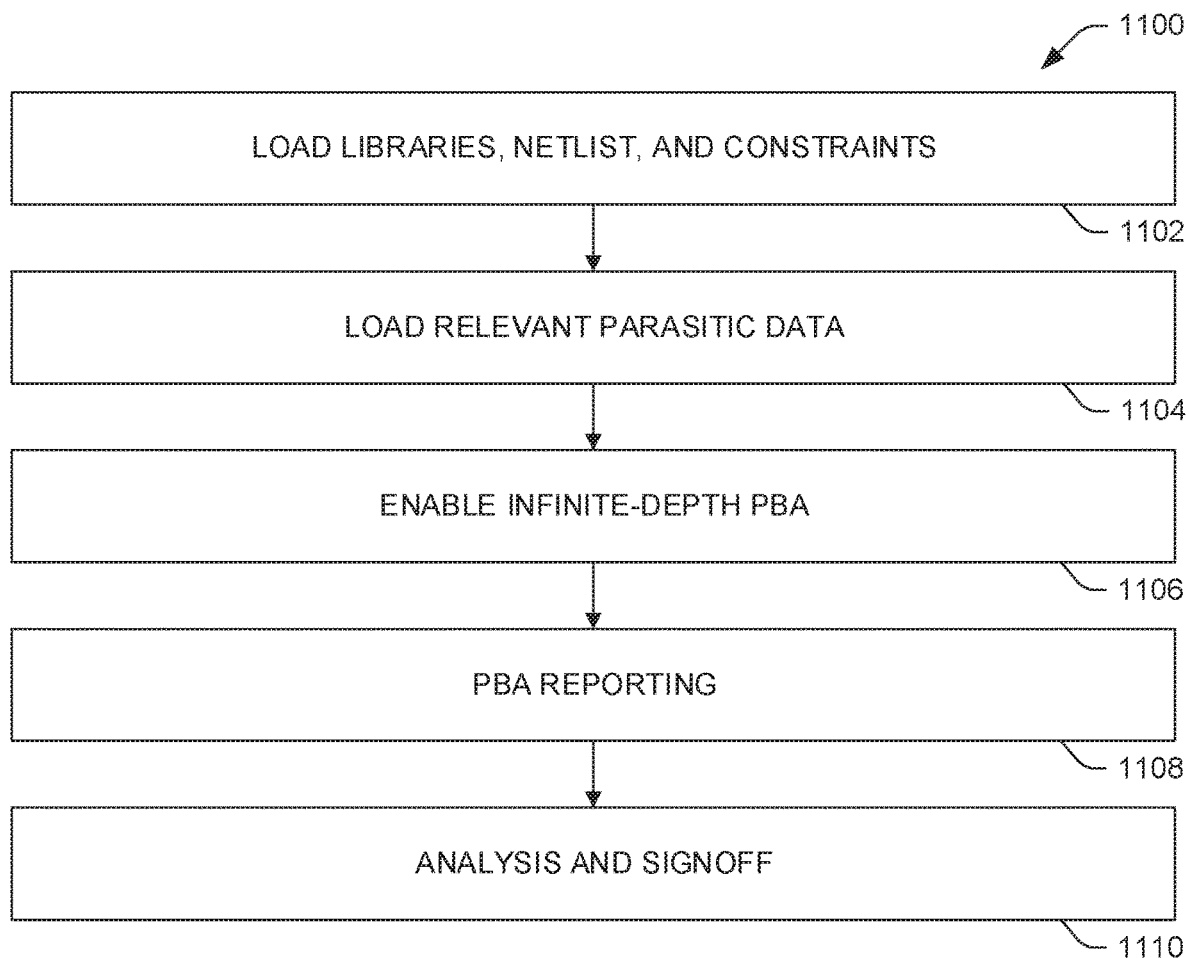
FIG. 11 is a flow chart illustrating an example workflow of a static timing analysis tool that includes an IPBA analysis function.

FIG. 11 illustrates a static timing analysis process 1100 that includes IPBA to analyze a digital circuit design for timing violations. After relevant inputs to the static timing analysis are loaded 1102, such as libraries, the netlist, constraints, and relevant parasitic data 1104, IPBA can be enabled 1106 to perform an IPBA method based on the provided inputs and to generate PBA reporting 1108 based on the results of the IPBA. Such reporting can be expected to indicate timing violations in the analyzed digital circuit design with reduced pessimism as compared to analogous reporting provided by GBA, but with greater coverage and/or reduced runtime as compared to analogous reporting provided by exhaustive PBA. Accordingly, analysis and signoff 1110, during which timing violations are addressed with revisions to the digital circuit design, can be accomplished with reduced time and/or lower computing resource requirements.

Figure 12:
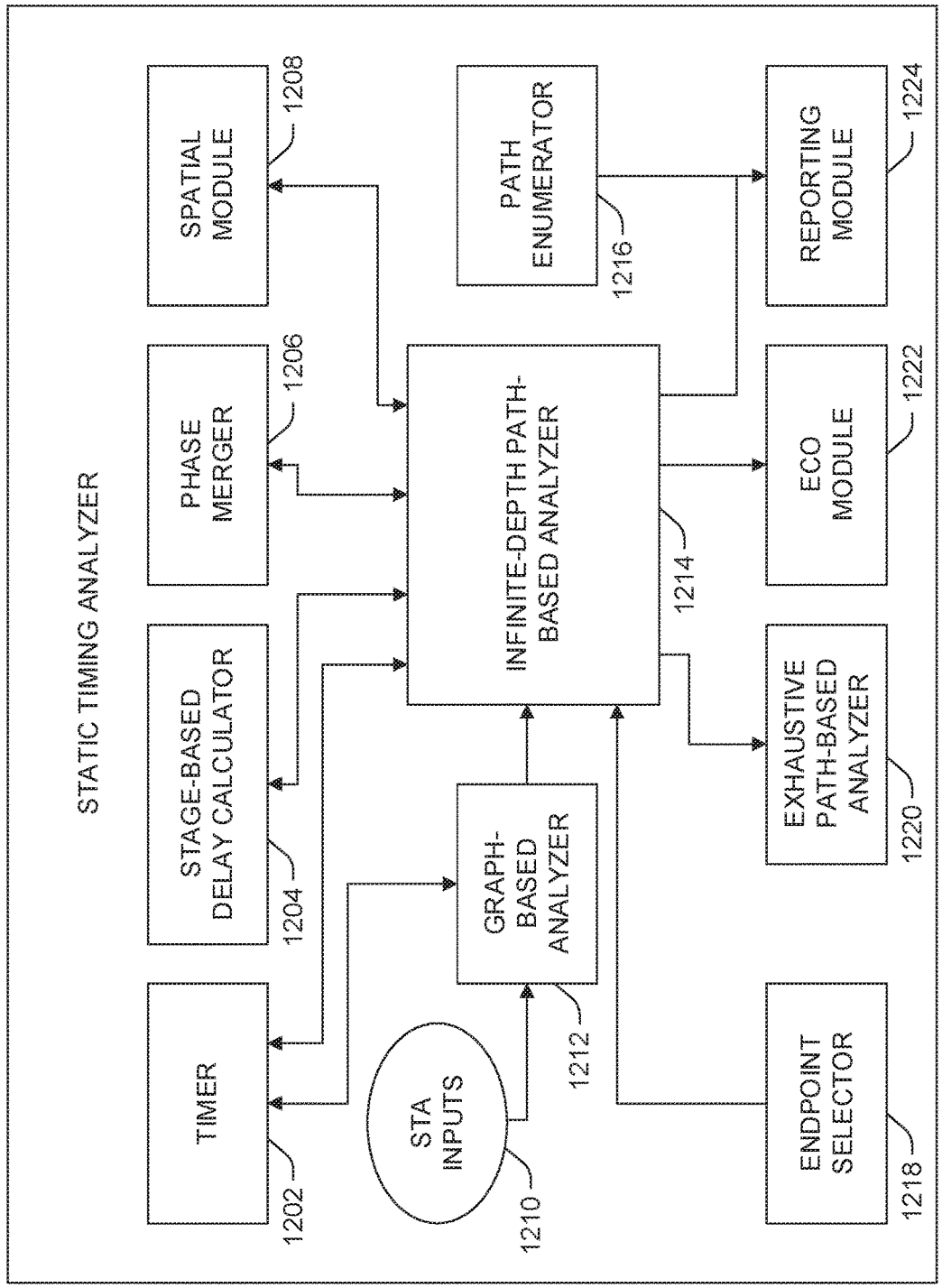
FIG. 12 is a block diagram of an example static timing analyzer that includes an infinite-depth path-based analyzer.

The system diagram of FIG. 12 illustrates a static timing analyzer 1200 that includes an infinite-depth path-based analyzer 1214 capable of analyzing a digital circuit design for timing violations with IPBA. Analyzer 1200 can correspond to analyzer 114 of FIG. 1 and can be implemented as one or more software components or in hardware as, for example, one or more application-specific integrated circuits (ASICs). The inputs 1210 for the static timing analysis, e.g., inputs 102-112 illustrated in FIG. 1, can first be provided to a graph-based analyzer 1212 that acts as a coarse filter to identify timing violations in an analyzed digital circuit design with a high amount of pessimism, thereby defining a GBA-violating zone in the circuit design, i.e., a set of paths determined by the GBA to violating timing requirements specified by inputs 1210.

The graph-based analyzer 1212 can make use of a timer 1202 to compute signal delay times at nodes in a graph representative of the digital circuit design under analysis. Timer 1202 can also be used by infinite-depth path-based analyzer 1214, which can receive the GBA-violating zone from the graph-based analyzer 1212 and can thereupon use IPBA to perform on the specified subset of the digital circuit design a timing analysis that is less pessimistic and thus more thorough than that performed by graph-based analyzer 1212. An endpoint selector 1218 can assist infinite-depth path-based analyzer 1214 by selecting endpoints for analysis according to specified criteria, e.g., by selecting the top N endpoints with the worst slack (N being an integer) for analysis and reporting. Upon slotting nodes of a graph into stages, infinite-depth path-based analyzer 1214 can further employ stage-based delay calculator 1204 to calculate signal propagation delays at the stages, and phase merger 1206 to merge phases at the nodes. A spatial module 1208 can provide infinite-depth path-based analyzer 1214 with estimated or predicted after-fabrication relative node depths and distances and/or the timing variation that can result therefrom.

The outputs of infinite-depth path-based analyzer 1214 can include an exhaustive path-based analyzer 1220 to provide even more thorough analysis of an IPBA violating zone or specified subset thereof, an engineering change order (ECO) module 1222 for automated, assisted, or fully manual revision of a simulated digital circuit design to address timing violations, and/or a reporting module 1224 to generate human- or machine-readable reports indicating timing violations in the analyzed digital circuit design as discovered by analyzer 1200 (and, particularly, as not eliminated from consideration as potentially violating by the reduced-pessimism IPBA performed by infinite-depth path-based analyzer 1214). Path enumerator 1216 enumerates paths for reporting. In PBA, first, a timing path is enumerated based upon GBA, and then PBA is performed on stages present in this path. In IPBA, however, it is other way around: first, timing is propagated on all design stages in the form of phases, and once worst IPBA timing is propagated, worst paths are enumerated based on stages that lead to worst timing. FIG. 2 relates to the PBA process. FIG. 12 shows that path enumerator 1216 is invoked after IPBA is performed by analyzer 1214.

Figure 13:
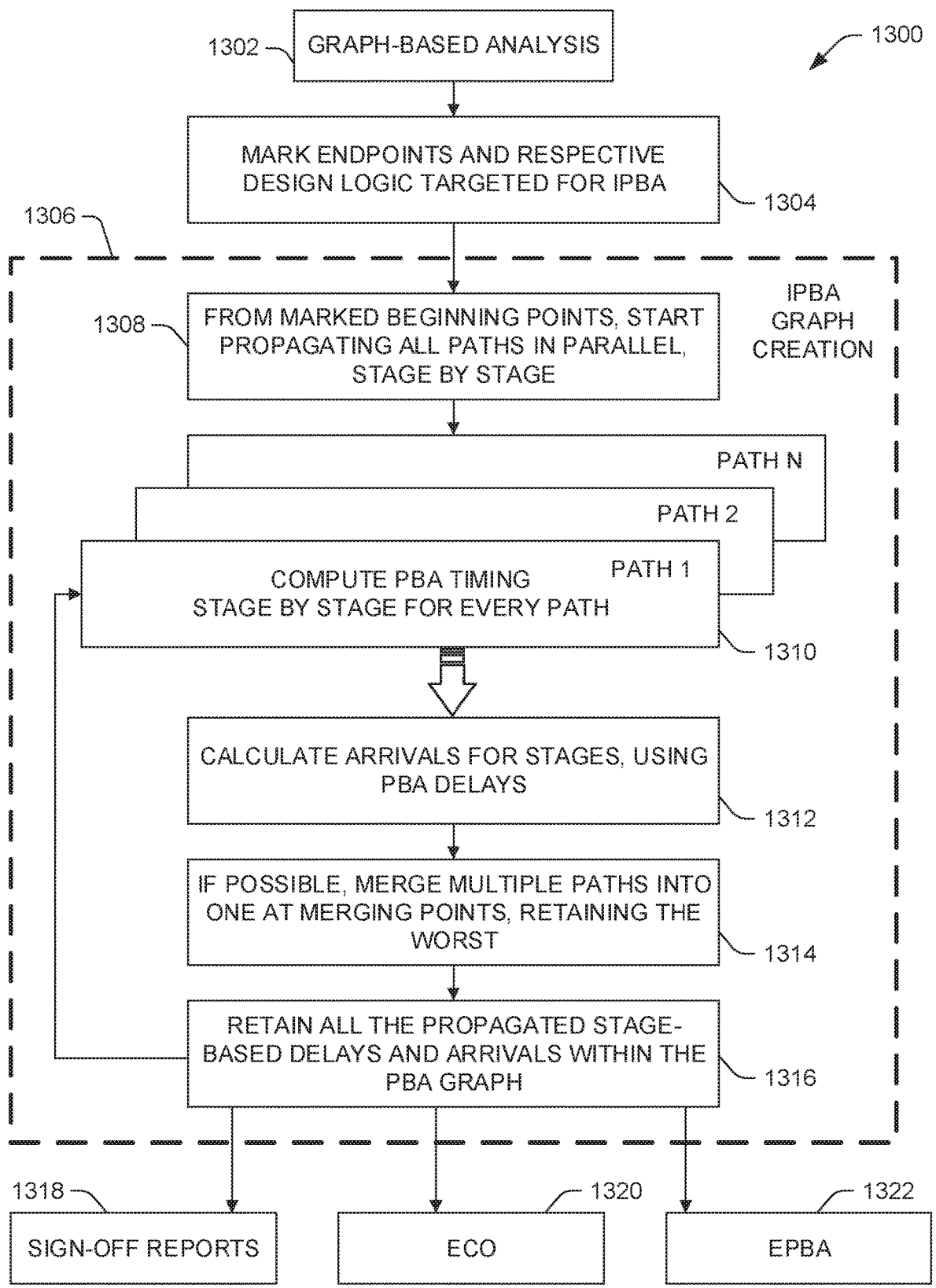
FIG. 13 is a flowchart illustrating an example static timing analysis method including IPBA graph creation.

FIG. 13 illustrates a static timing analysis method 1300 that can include IPBA graph creation 1306 to analyze a digital circuit design for timing violations. GBA 1302 can be performed to provide a GBA-violating zone. Endpoints in the digital circuit design can be marked and respective logic in the digital circuit design can be targeted 1304 for analysis with IPBA, which includes propagating 1308 all phases in parallel, stage-by-by-stage, starting from marked beginning points in a graph of the targeted logic. For all the paths 1310, i.e., paths 1 through N, the PBA timing is computed stage by stage (as opposed to path by path). Using computed PBA delays, signal arrival times are calculated 1312 for stages, e.g., by feeding the stages with PBA delays to a timer such as timer 1202 of FIG. 12 for calculation of signal arrival times. Where possible, multiple phases are merged 1314 at merging points, retaining the worst. Merging is considered "possible" where propagated values from one phase dominate propagated values from another phase for all relevant times, as described above. All the propagated stage-based delays and arrivals are retained 1316 within the PBA graph. Operations 1312, 1314, 1316 are re-iterated for each stage. Upon the traversal of all the stages in the graph, sign-off reports can be generated 1318, engineering change orders (ECO) 1320 can modify the circuit design (which can be followed by re-analysis), and/or exhaustive PBA can be performed 1322 on remaining violating portions of the circuit design or some subset thereof.

IPBA systems and methods can enable users to run extremely fast and efficient PBA for full digital circuit design timing analysis. Even during early stages of design cycle, when the design is "dirty" and in a highly violating state, designers can undertake infinite-depth path-based timing analysis to discount for the GBA pessimism and get an early understanding of real timing covering all violating timing paths or endpoints of the design. Having a quick and efficient method with reduced pessimism compared to GBA that is closer to exhaustive PBA accuracy can help analyze real timing violations early on and help achieve faster design closure.

While there exist PBA approaches to increase design coverage and provide worst slacks, there is no technique which could efficiently achieve full PBA coverage of all violating paths in a short time with signoff accuracy. With IPBA, complete PBA coverage with signoff accuracy is expected and with improved runtimes, as the analysis performed uses a propagation approach more similar to that used in GBA, while still propagating path-based delays and waveforms for all phases independently (unlike the brute-force worst casing done in GBA).

IPBA systems and methods therefore overcome many existing limitations and provide a novel solution to introduce and implement creation of a PBA graph along similar lines as GBA graph yet distinct from it. The IPBA methods take advantage of the existing graph and its worst casing and leverage it to create, propagate retimed attributes (such as waveforms, arrivals, slews, etc.) and merge them such that it reduces GBA pessimism. IPBA leverages the GBA graphs by replicating existing timer phases available in GBA graph and propagates its timing on top of those. IPBA methods reduce software burden and analysis runtime in trying to cover all violating timing paths which amplify further due to re-convergence. IPBA provides a PBA solution which is closely accurate to that of exhaustive PBA also being highly convergent and much faster. Unlike PBA, IPBA is not limited by any processing limits such as max paths or depth. It ensures PBAs of the complete GBA-violating zone. IPBA methods can be easily enabled such that any given STA/signoff setup can be used to employ the IPBA approach. IPBA does not require any re-structuring, overhauling, or porting of existing timing analysis infrastructure. IPBA methods can target PBA graph creation for one or more selective nodes, for violating zones only, or for an entire graph. IPBA methods can be instrumental if there is a need to target one or more than one set of selected endpoints, because IPBA allows users to zone out to specific endpoints. For example, a graph can be created for setup or hold violating endpoints only. If there is a need, the entire graph can also be replicated.

Figure 14:
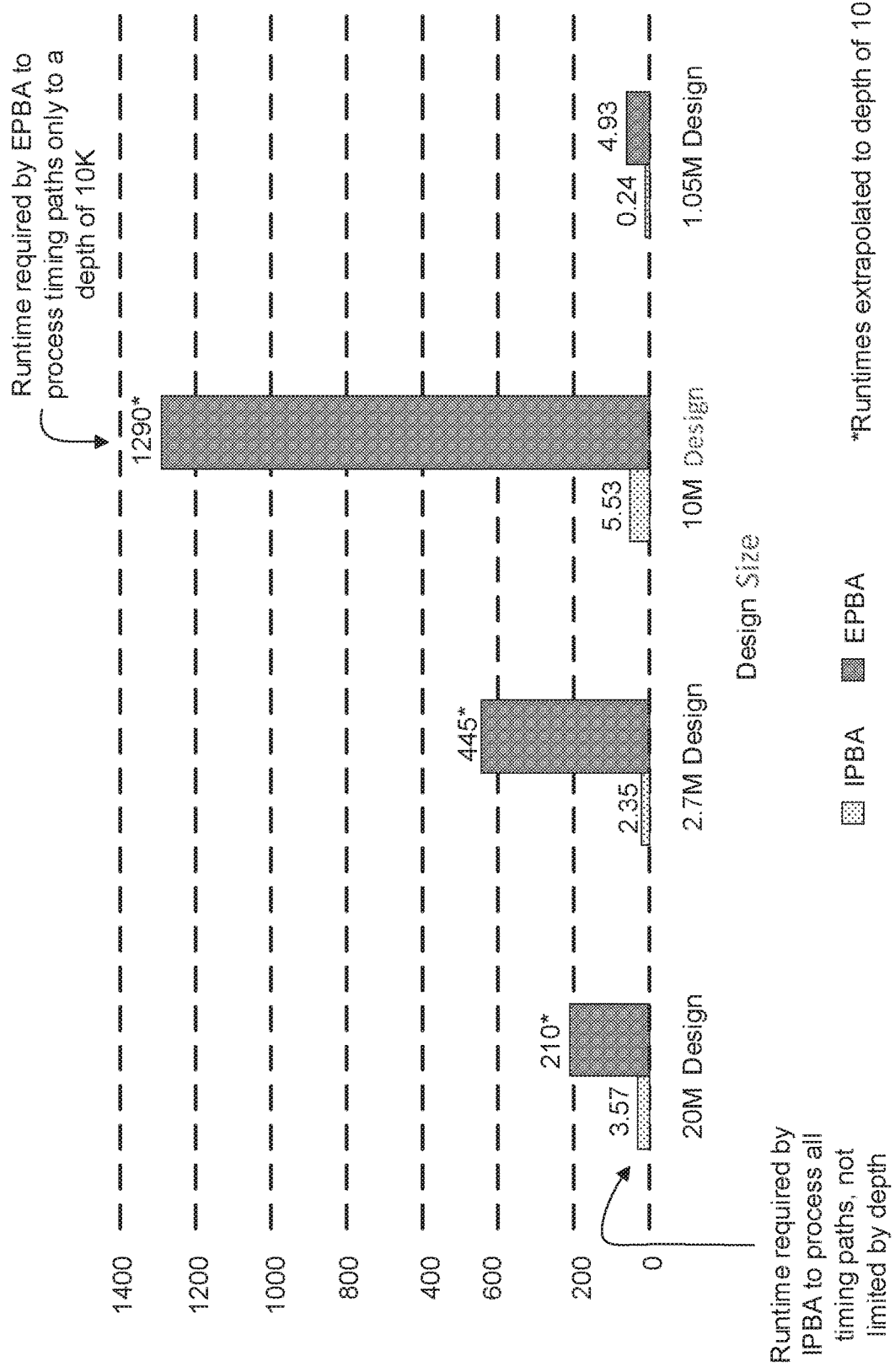
FIG. 14 is a bar chart illustrating example performance improvements of IPBA versus EPBA for four digital circuit designs of various size.

The bar chart of FIG. 14 shows a coverage and runtime comparison between IPBA and EPBA done for four designs, respectively having 20 million nodes, 2.7 million nodes, 10 million nodes, and 1.05 million nodes. The results show that despite investing impractically high runtimes of hundreds of hours, EPBA is unable to achieve full retime coverage of all violating timing paths. The EPBA processing is performed in default mode, i.e., processing every endpoint only up to a depth of 10K and up to a maximum of 20M timing paths. IPBA, on the other hand, can efficiently retime all violating paths in the design, without needing to be depth limited or max-paths limited. IPBA has shown 20-230× runtime improvements over default-depth EPBA. Extrapolating EPBA runtime numbers for achieving infinite depth/complete coverage like in IPBA, may show in 1000× or greater improvement in runtime.

Figure 15:
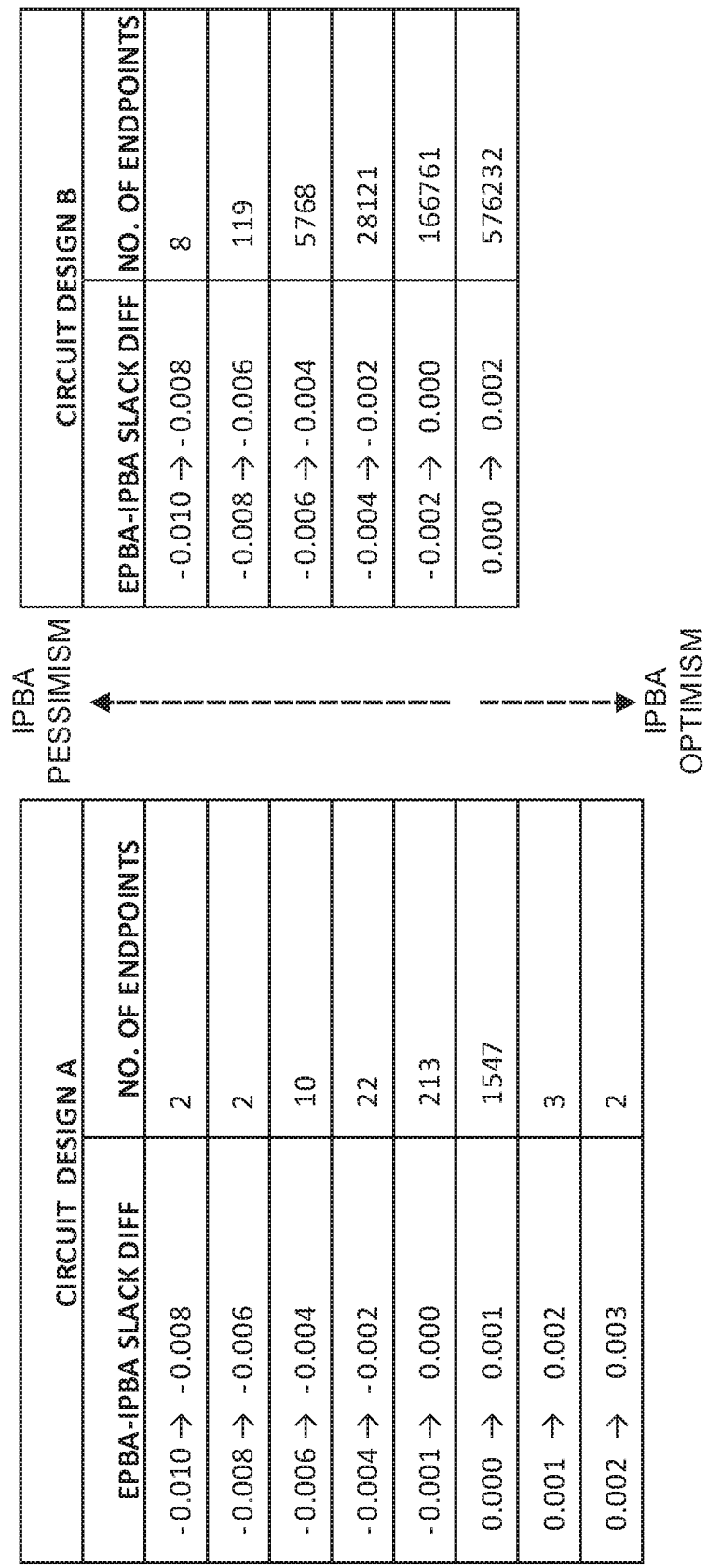
FIG. 15 shows two tables illustrating example slack timing quality of result (QoR) for IPBA versus EPBA.

Slack timing QoR of IPBA can be demonstrated with a QoR comparison between IPBA and EPBA performed on circuit designs with respect to slacks reported on the same endpoints. The tables of FIG. 15 show example differences in EPBA and IPBA slacks reported on the same sets of endpoints, taking EPBA slacks as reference, for two example circuit designs, Design A and Design B. A negative slack difference (of IPBA slack minus EPBA slack) indicates by how much IPBA results are pessimistic compared to those of EPBA; a positive slack difference indicates by how much IPBA results are optimistic compared to those of EPBA. The illustrated results on the two digital circuit designs concur with the expectation that PBA slacks reported by IPBA are bounded by IPBA compared those reported by EPBA.

The infinite-depth PBA methods and systems described herein provide the capability to evaluate all paths to violating endpoints within practically reasonable runtimes that do not explode irrespective of high violation counts, large design sizes, or increased re-convergence in designs. The IPBA methods and systems provide a solution for PBA which is not depth-limited, thereby enabling improved design coverages for PBA, making 100% PBA coverage attainable. The IPBA methods and systems provide reduced runtimes along with full design coverage by moving away from the method of path peeling for PBA processing while still ensuring that maximum design coverage is provided for PBA optimization.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method for detecting timing violations in a circuit design, the method comprising:

executing an infinite-depth path-based static timing analysis (IPBA) with at least one processor coupled to a memory storing physical implementation data for the circuit design having a plurality of timing paths, each path proceeding between a beginning point for the path and an endpoint for the path, and each path having at least one node thereon, the IPBA comprising:

slotting nodes of a designated subset of the plurality of timing paths into stages;

propagating a plurality of signals through the nodes of the plurality of timing paths stage-by-stage, in parallel, and for at least a respective one of the stages:
  computing path-based static timing analysis (PBA) timing characteristic values for each signal, of the plurality of signals, arriving at a respective node in the respective stage; and
  merging corresponding first and second timing characteristic values of the computed timing characteristic values by propagating from the respective node, to a subsequent node in a path shared by the respective node and the subsequent node, the first timing characteristic value and not the corresponding second timing characteristic value.

2. The method of claim 1, wherein the merging is based on the respective node converging multiple paths of the subset of the plurality of timing paths, and further based on a determination that the first timing characteristic value propagated to the respective node from a first of the multiple paths dominates the corresponding second timing characteristic value propagated to the respective node from a second of the multiple paths.

3. The method of claim 1, wherein the stage-by-stage propagation of the plurality of signals uses a breadth-first search (BFS) graph traversal technique.

4. The method of claim 1, further comprising, prior to executing the IPBA, executing a graph-based static timing analysis (GBA) with the at least one processor or at least one different processor to identify a subset of the circuit design defining a GBA-violating zone comprising paths having potential timing violations as determined by the GBA, and wherein the designated subset of the plurality of timing paths for which the IPBA is performed is limited to the GBA-violating zone.

5. The method of claim 1, wherein the physical implementation data comprises a gate-level netlist, library models, timing derate tables, and parasitic data models.

6. The method of claim 1, wherein the first and second timing characteristic values are one of waveforms, slew, arrivals, or delays for respective signals arriving at the respective node.

7. The method of claim 1, further comprising, after the executing the IPBA, executing an exhaustive path-based static timing analysis (EPBA) with the at least one processor or at least one different processor to further analyze paths identified as violating by the IPBA.

8. The method of claim 1, further comprising, after the executing the IPBA, executing an engineering change order (ECO) based on results of the IPBA to provide a remedial transformation of the circuit design.

9. The method of claim 1, further comprising, prior to executing the IPBA, selecting a user-configurable top N GBA-violating endpoints, and marking fan-in cones for the N endpoints in the circuit design, such that during the executing the IPBA, IPBA timing is propagated across the marked fan-in cones only.

10. The method of claim 9, further comprising reporting timing results for analyzed endpoints, and wherein for a user-selected M endpoints to have associated timing results reported, with M being greater than N, IPBA timing results are reported for the N endpoints analyzed using IPBA, and GBA timing results are reported for the other M minus N endpoints.

11. A system for detecting timing violations in a circuit design, the system comprising:
  at least one processor coupled to a memory storing physical implementation data for a circuit design having a plurality of timing paths, each path proceeding between a beginning point for the path and an endpoint for the path, and each path having at least one node thereon;
  an infinite-depth path-based static timing analyzer configured to perform infinite-depth path-based static timing analysis (IPBA), the IPBA comprising:
    slotting nodes of a designated subset of the plurality of timing paths into stages;
    propagating a plurality of signals through the nodes of the plurality of timing paths stage-by-stage, in parallel, and for at least a respective one of the stages:
      computing path-based static timing analysis (PBA) timing characteristic values for each signal, of the plurality of signals, arriving at a respective node in the respective stage; and
      merging corresponding first and second timing characteristic values of the computed timing characteristic values by propagating from the respective node, to a subsequent node in a path shared by the respective node and the subsequent node, the first timing characteristic value and not the corresponding second timing characteristic value.

12. The system of claim 11, wherein the merging is based on the respective node converging multiple paths of the subset of the plurality of timing paths, and further based on a determination that the first timing characteristic value propagated to the respective node from a first of the multiple paths dominates the corresponding second timing characteristic value propagated to the respective node from a second of the multiple paths.

13. The system of claim 11, wherein the infinite-depth path-based static timing analyzer is configured to perform the stage-by-stage propagation of the plurality of signals using breadth-first search (BFS) graph traversal.

14. The system of claim 11, further comprising a graph-based static timing analyzer configured to execute, prior to the executing the IPBA, a graph-based static timing analysis (GBA) to identify a subset of the circuit design defining a GBA-violating zone comprising paths having potential timing violations as determined by the GBA, and wherein the infinite-depth path-based static timing analyzer is configured to perform IPBA only on the subset of the plurality of timing paths in the GBA-violating zone.

15. The system of claim 11, wherein the physical implementation data comprises a gate-level netlist, library models, timing derate tables, and parasitic data models.

16. The system of claim 11, wherein the first and second timing characteristic values are one of waveforms, slew, arrivals, or delays for respective signals arriving at the respective node.

17. The system of claim 11, further comprising an exhaustive path-based static timing analyzer configured to receive results from the infinite-depth path-based static timing analyzer and to execute an exhaustive path-based static timing analysis (EPBA) to further analyze paths identified as violating by the IPBA.

18. The system of claim 11, further comprising an engineering change order (ECO) module configured to receive results from the infinite-depth path-based static timing analyzer and to suggest or implement in the circuit design an ECO based on the results to provide a remedial transformation of the circuit design.

19. A non-transitory computer-readable medium storing instructions that, when executed on a processor, perform infinite-depth path-based static timing analysis (IPBA) to analyze physical implementation data for a circuit design having a plurality of timing paths, each path proceeding between a beginning point for the path and an endpoint for the path, and each path having at least one node thereon, the IPBA comprising:

slotting nodes of a designated subset of the plurality of timing paths into stages;

propagating a plurality of signals through the nodes of the plurality of timing paths stage-by-stage, in parallel, and for at least a respective one of the stages:

computing path-based static timing analysis (PBA) timing characteristic values for each signal, of the plurality of signals, arriving at each respective node in the respective stage; and merging corresponding first and second timing characteristic values of the computed timing characteristic values by propagating from the respective node, to a subsequent node in a path shared by the respective node and the subsequent node, the first timing characteristic value and not the corresponding second timing characteristic value.

20. The computer-readable medium of claim 19, wherein the merging is based on the respective node converging multiple paths of the subset of the plurality of timing paths, and further based on a determination that the first timing characteristic value propagated to the respective node from a first of the multiple paths dominates the corresponding second timing characteristic value propagated to the respective node from a second of the multiple paths.

* * * * *